United States Patent [19]
Sharp et al.

[11] Patent Number: 6,100,944
[45] Date of Patent: Aug. 8, 2000

[54] POLARIZING INTERFEROMETER USING MULTIORDER AND ZERO ORDER BIREFRINGENCE SWITCHES

[75] Inventors: Gary Sharp, Boulder; Steven A. Serati, Golden; Teresa Kaye Ewing, Longmont, all of Colo.

[73] Assignee: Boulder Nonlinear Systems, Inc., Lafayette, Colo.

[21] Appl. No.: 08/948,860

[22] Filed: Oct. 10, 1997

[51] Int. Cl.$^7$ .................................................. G02F 1/133
[52] U.S. Cl. ................................ 349/19; 349/1; 356/346
[58] Field of Search ............................ 349/19, 202, 261; 356/321, 322, 345, 351, 365, 356, 346, 320, 327, 332; 359/578, 587, 588

[56] References Cited

U.S. PATENT DOCUMENTS

| | | | |
|---|---|---|---|
| 4,129,357 | 12/1978 | Title | 359/498 |
| 4,232,948 | 11/1980 | Shanks | 350/347 R |
| 4,635,051 | 1/1987 | Bos | 340/757 |
| 4,770,500 | 9/1988 | Kalmanash et al. | 350/347 E |
| 4,848,877 | 7/1989 | Miller | 349/184 |
| 5,132,826 | 7/1992 | Johnson et al. | 359/93 |
| 5,231,521 | 7/1993 | Johnson et al. | 359/93 |
| 5,243,455 | 9/1993 | Johnson et al. | 359/93 |
| 5,347,378 | 9/1994 | Handschy et al. | 359/53 |
| 5,381,253 | 1/1995 | Sharp et al. | 359/53 |
| 5,469,279 | 11/1995 | Sharp et al. | 359/53 |
| 5,528,393 | 6/1996 | Sharp et al. | 359/53 |
| 5,627,666 | 5/1997 | Sharp et al. | 349/74 |
| 5,658,490 | 8/1997 | Sharp et al. | 252/299.01 |

OTHER PUBLICATIONS

Biernacki, P. et al. (1991), "Polarization Dependence and Uniformity of FLC Layers for Phase Modulation," Proc. of the SPIE Conf: Liquid Crystal Devices and Materials, San Jose, CA Feb. 27, 1991, 12 pp.

Harlharan, P and Ciddor, P.E. (1997), "Achromatic switchable polarization rotators," Opt. eng. 36(3):952–956.

Koester, C.J. (1959), "Achromatic Combinations of Half-Wave Plates," J. Opt. Soc. Am. 49(4):405–409.

Pancharatnam, S. (1955), "Achromatic Combinations of Birefringent Plates. Part I. An Achromatic Circular Polarizer," Indian Acad. Sci. Proceedings A41:130–136.

Pancharatnam, S. (1955), "Achromatic Combinations of Birefringent Plates. Part II. An Achromatic Quarter–Wave Plate," Indian Acad. Sci. Proceedings A41:137–144.

Schadt, M. et al. (1995), "Photo–Generation of Linearly Polymerized Liquid Crystal Aligning Layers Comprising Novel, Integrated Optically Patterned Retarders and Color Filters," Jpn. J. Appl. Phys. 34:3240–3249.

Title, A.M. (1981), "Tunable birefringent filters," Opt. Eng. 20(6):815–823.

Title, A.M. (1975), "Improvement of Birefringent Filters. 2: Achromatic Waveplates," Appl. Opt. 14(1):229–237.

Title, A.M. and Rosenberg, W.J. (1981), "Spectral management," SPIE 268 Imaging Spectroscopy:178–182.

Wolf, E. (ed.) (1967) *Progress in Optics*, North–Holland Publishing Company—Amsterdam, pp. 73–104.

*Primary Examiner*—Kenneth Parker
*Attorney, Agent, or Firm*—Greenlee, Winner and Sullivan, P.C.

[57] ABSTRACT

The present invention provides a polarizing interferometer multiplex spectrometer using a zero-order switch, a multi-order switch and an output polarizer to multiplex the recovery of an entire input spectrum. The zero-order switch and multi-order switch require input light of a fixed polarization; thus the present invention provides a preferred embodiment that uses a zero-order switch and a multi-order switch positioned between an input polarizer and an output polarizer. For a sequence of time delays incremented by the multi-order and zero-order switches, the total transmitted power at all wavelengths is measured. From these, the coefficients of a Fourier series representation of the input spectrum are obtained, and the entire spectrum is mathematically reconstructed. Although the structure is similar to a tunable interference filter, the PIMS does not function as a filter, and more particularly, does not scan the transmission wavelength and measure power as a function of wavelength. The present invention further provides a multi-order switch that uses an active LC device to switch between summing and differencing the retardances of two fixed retarders. The present invention further provides a method of obtaining a Fourier series representation of a spectrum of input light.

37 Claims, 20 Drawing Sheets

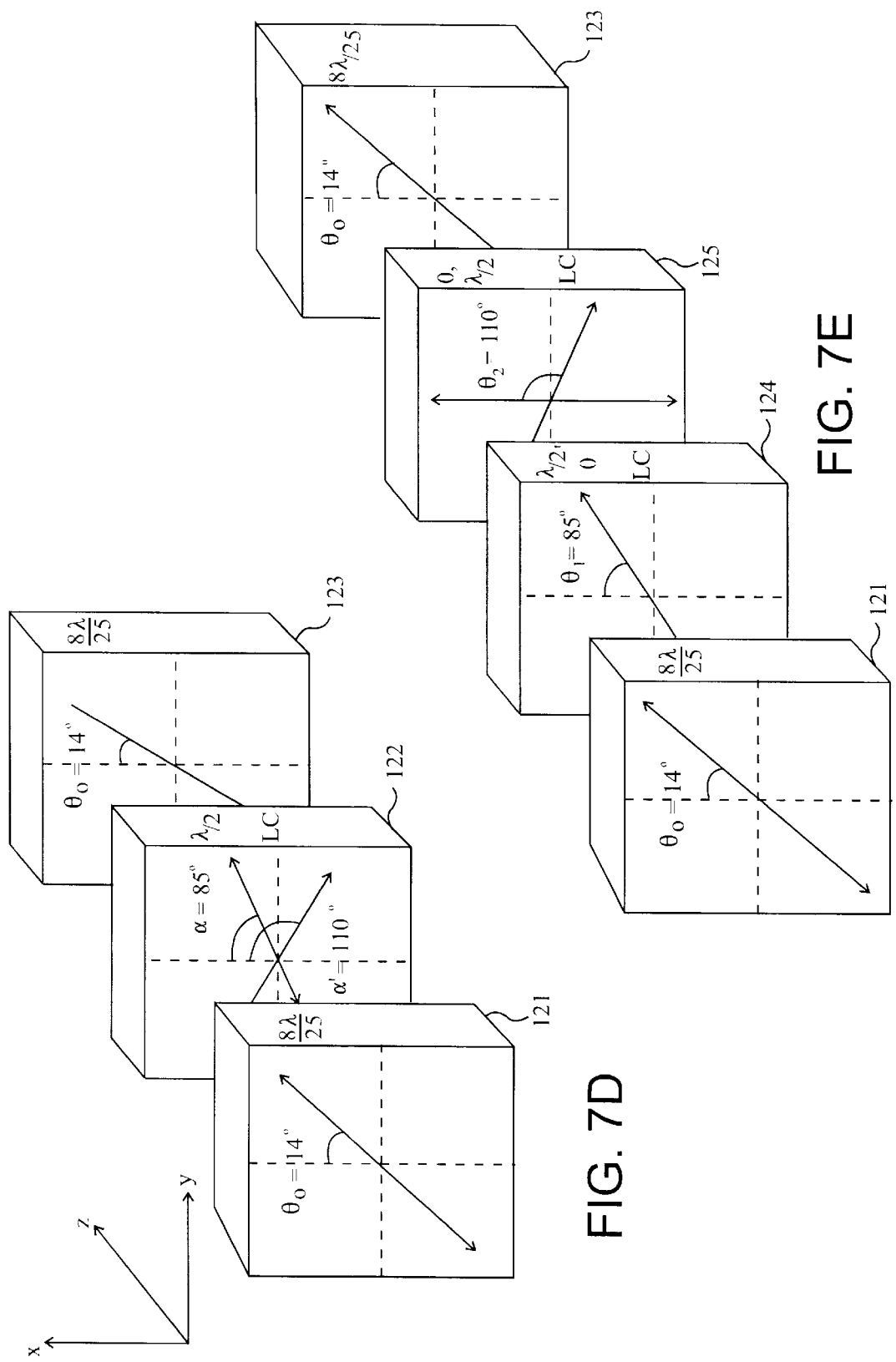

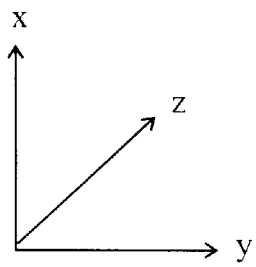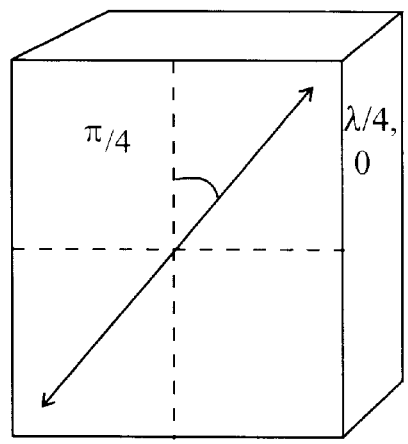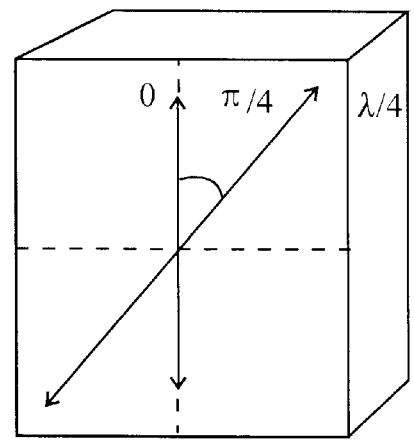
FIG. 7F          FIG. 7G

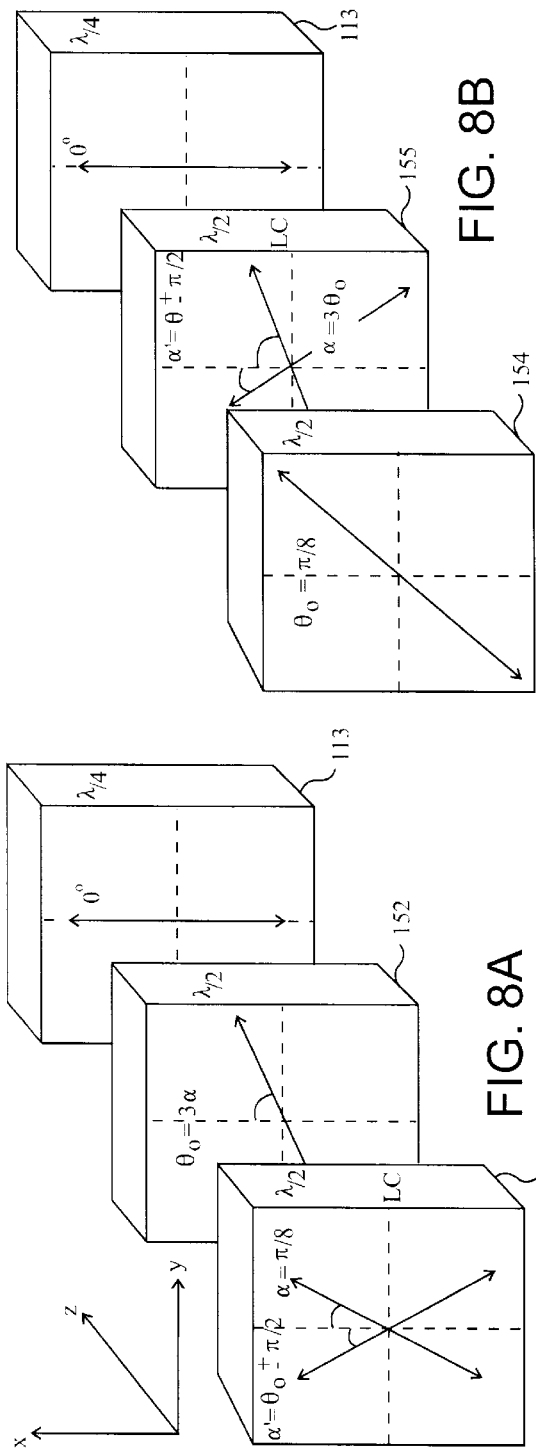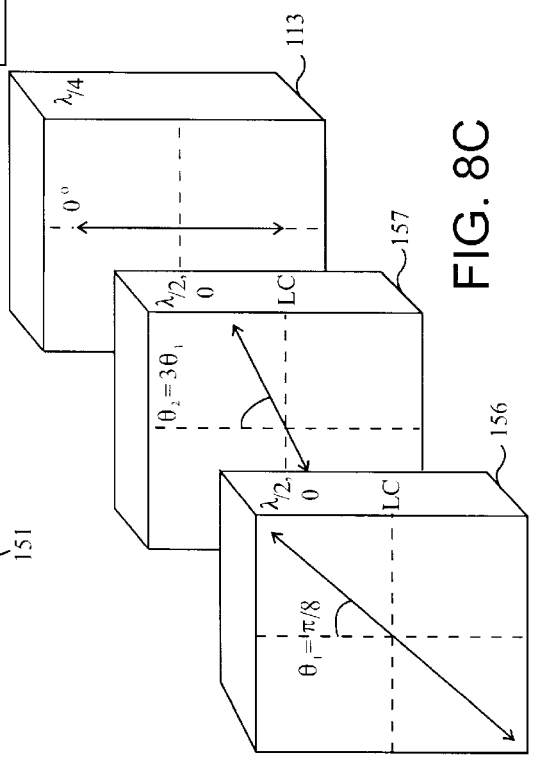

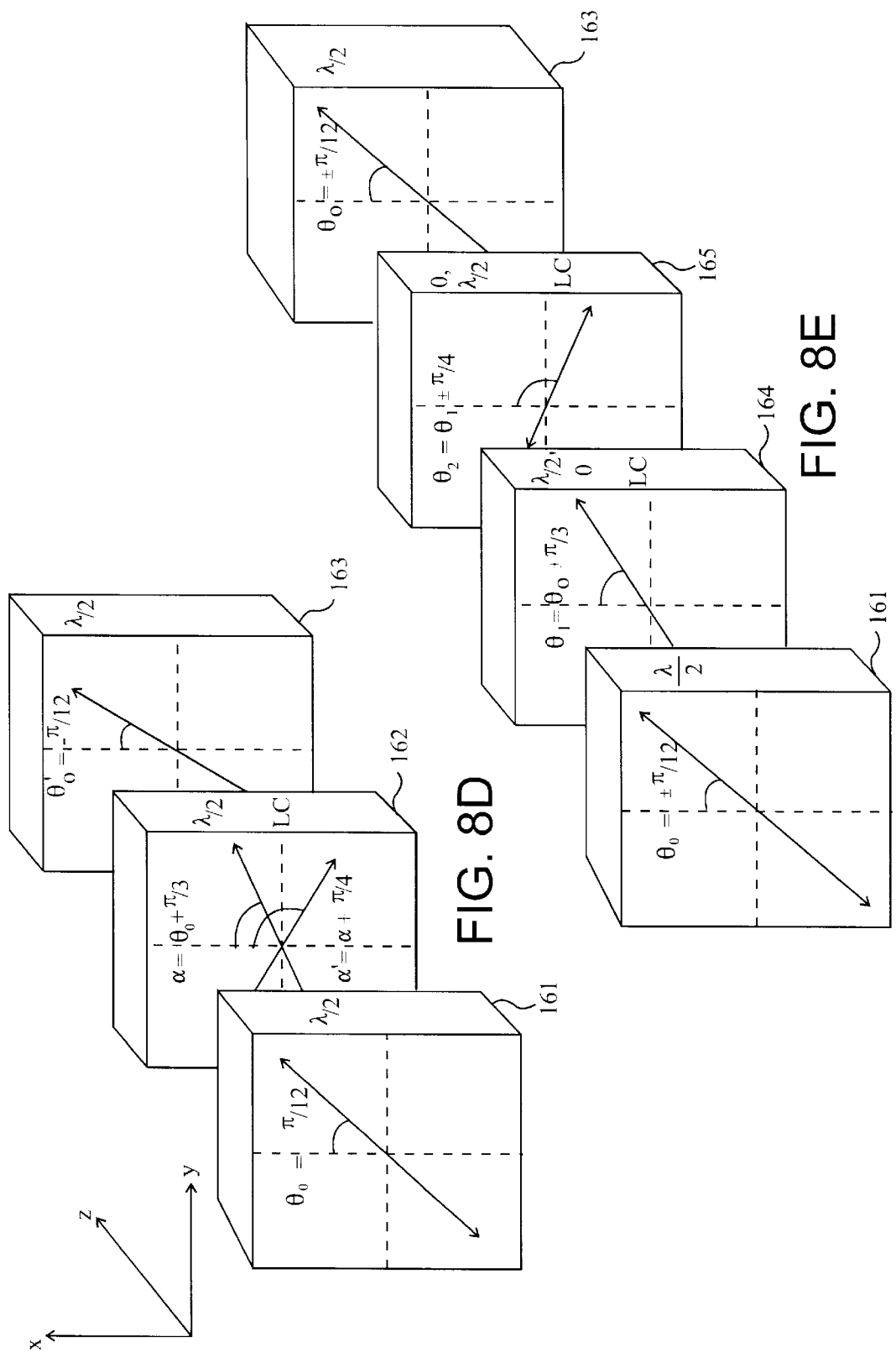

POLARIZING INTERFEROMETER USING MULTIORDER AND ZERO ORDER BIREFRINGENCE SWITCHES

FIELD OF THE INVENTION

The present invention relates to interferometers having liquid crystal materials as optical elements and in particular relates to multiplexing spectrometers that obtain a Fourier series representation of a spectrum.

BACKGROUND OF THE INVENTION

Applications for high-speed imaging spectrometers continue to grow rapidly, including DNA sequencing, chemical analysis, semiconductor process monitoring, machine vision, environmental multi-spectral imaging, and remote sensing of gasses. CCD camera and infrared (IR) focal plane array technologies continue to mature, providing high density, sensitivity, and increased frame rate, with falling costs. However, there is a need for solid-state filter technologies that successfully convert these receivers to either multi-spectral imagers or multiplex spectrometers. The present invention provides a polarizing interferometer multiplex spectrometer (PIMS) to fill this need.

There are several technologies that represent the standards of the spectrometry industry. There are three well accepted technologies: diode array grating/prism monochromators, rotating filter wheels and Fourier transform spectrometers (FTS). In addition, there are two technologies, acousto-optic tunable filters and nematic liquid crystal (LC) tunable filters, that are relatively new to the spectrometry industry. In broad terms, imaging spectrometry technology breaks down according to four performance factors: (1) throughput, which includes dependence on the polarization of input light, multiplex ability, aperture, acceptance angle or field-of-view (FOV), transmission, and update rate, (2) tuning, for sequential instruments, which includes tuning speed, tuning drive scheme (e.g. solid state, mechanical etc.), and fullness of spectral recovery, (3) optical characteristics which include resolution, spectral coverage, dynamic range, finesse, stray light rejection, and modulation transfer function, and (4) practical concerns such as instrument size, power use, vibration sensitivity, and cost.

The acousto-optic tunable filter (AOTF) has the advantages of high finesse and high dynamic range. The AOTF is essentially a volume grating written in a crystalline medium with an acoustic signal which acts as a high-resolution tunable bandpass filter. Tuning is accomplished by varying the acoustic frequency. An AOTF instrument suffers from small apertures, a poor FOV, and possesses no multiplex advantage. Furthermore, AOTF technology is diffractive in nature; thus an AOTF instrument has registration problems on a camera because the image is deflected. Due to image distortion, AOTF technology in recent years has been relegated to use in intensified multi-spectral and low spatial resolution applications.

The nematic LC tunable filter is typically a tunable Lyot type polarization interference filter (PIF). The major performance drawbacks of the nematic LC tunable filter instrument are poor throughput and poor dynamic range. Throughput is hampered by a loss due to polarizing the input light, absorption by multiple polarizers, a narrow FOV, and the lack of a multiplexing. Perhaps a more severe limitation of the nematic LC tunable filter technology is the poor dynamic range it provides. PIFs are finite impulse response filters, just like electronic digital filters, and thus fundamentally require many stages to practically provide desired finesse and stray light rejection. In addition, the slow tuning (>20 milliseconds) of a nematic LC tunable filter prohibits rapid spectral update rates.

Diode array grating/prism monochromator instruments are bulky and expensive. Perhaps more importantly, they distribute wavelength information spatially, making them inappropriate for imaging. Monochromators are also not multiplex instruments.

The rotating filter wheel is a well accepted instrument in imaging spectrometry. It has the advantages of arbitrarily high resolution, high finesse, and broad spectral coverage. However, an important factor for many imaging spectrometry applications is spectral recovery, while rotating filter wheel technology is not practical for sampling a spectrum at more than roughly ten bands. This is due to scaling since the number of wavelength samples is identically the number of filters. Finally, rotating filter wheels are not suitable for implementing multiplex instruments.

Prior arguments for selecting rotating filter wheels over liquid crystal (LC) polarization interference filter technology (low throughput, poor dynamic range, and high cost), do not apply to the present invention. In general, a PIMS has greater throughput than the rotating filter wheel (owing to its ability to multiplex, and use of only two polarizers) and can be made inexpensively. Finally, the use, in a preferred embodiment, of high speed of ferroelectric liquid crystal (FLC) materials also allows the PIMS to sample at much greater rates than a rotating filter wheel instrument.

Interferometers, including FTS instruments and the present invention, inherently possess multiplex ability. Multiplex ability refers to the ability of an instrument to obtain, simultaneously, many pieces of information on a single carrier (e.g. all frequency information of a spectrum, over a given bandwidth, is contained in a single output of an interferometer). Interferometers separate a single field component of input light into two equal amplitude components, introduce a time delay between them and subsequently interfere them to produce output light with a total integrated optical power which is given by the autocorrelation function of the input light. As is well known in the art, the total integrated optical power of the output light from an interferometer can be expressed as, $$P_{out}(\tau) = \frac{1}{2}\int_{-\infty}^{\infty} I(\omega)d\omega + \frac{1}{2}\int_{-\infty}^{\infty} I(\omega)\cos\omega\tau d\omega \qquad (1)$$

Here $P_{out}(\tau)$ is the total integrated optical power of the output light, $\tau$ is the time delay and $I(\omega)$ is the power spectral density, or spectrum, of the input light. In a FTS instrument, the argument of the cosine term in equation 1 can only be changed in a wavelength sensitive manner. Thus, reconstruction of the input spectrum with FTS technology can only be achieved by a Fourier transformation of $P_{out}(\tau)$. As is well known in the art, this Fourier transformation must be done with care to minimize Gibbs phenomenon. Gibbs phenomenon is normally reduced numerically in the computation of the transform in a process referred to as apodization. Several apodization functions are available for this process, each having their characteristic features and limitations.

A Fourier transform spectrometer is the highest throughput instrument currently available and provides exceptional dynamic range. However, a FTS is difficult to image through, bulky, has high power consumption and is very expensive. In addition, as a two-path interferometer that relies on accurate electromechanical translation of a mirror to create a path difference, a FTS is vibration sensitive, requires a calibration source and active synchronization. Accordingly, achievement of accurate electromechanical mirror translation entails a complex drive scheme. Perhaps most importantly, reliance on accurate: electromechanical translation of a mirror has confined FTS technology to the infrared region. Finally, samples with a FTS are acquired slowly—far below the frame rates of CCD cameras. In short, these problems make a FTS a very poor match for the requirements of imaging spectrometry.

The present invention, like a conventional Fourier transform spectrometer, offers a high throughput and full-spectral measurement. Additionally, the present invention, like a FTS, is an interferometer. However, whereas a FTS introduces a time delay via a free-space path length difference, the present invention introduces a time delay via a refractive index difference in a crystal. Thus, the present invention eliminates electromechanical tuning. As a result, the present invention is insensitive to vibration, relatively insensitive to temperature changes, and requires no calibration sources. Another result of the elimination of electromechanical tuning is greatly relaxed fabrication tolerances. Thus, in the present invention, it is simple to fabricate large aperture devices with wide fields-of-view. Such fields-of-view cannot be achieved using any other interferometer technology. Further, the use in the present invention of a birefringent crystal allows the two equal amplitude field components of the interferometer to propagate substantially co-linearly along a common path. Therefore, the present invention is conducive to imaging and to manufacture as a compact solid-block package.

Moreover, the present invention provides polarization-based achromatic phase-shifters that allow wavelength insensitive shifts of the interference fringes (i.e., the argument of the cosine term in equation 1), unlike a FTS instrument, over very broad bands. Thus, the present invention can directly obtain the Fourier series coefficients of an input spectrum. As a consequence, the present invention can reconstruct the input spectrum without performing a Fourier transformation or apodization. Further, in the present invention the time-delay is digitally switched using LC devices; this allows an interferometer to be implemented using no moving parts. Furthermore, the use of digital devices allow precise switching between effective "mirror positions," without the need for a calibration laser. In a preferred embodiment, the present invention uses ferroelectric LC materials, which switch in under 50 microseconds, allowing rapid data collection. Since in the present invention each sample is acquired after waiting the LC settling time, there are no problems associated with synchronization, as found with conventional FTS instruments. Finally, because of the high precision available in controlling polarization, the present invention provides devices that operate in the ultraviolet (UV) through the near-infrared (NIR).

In sum, the present invention offers an imaging spectrometer with high throughput and full-spectral coverage. The present invention uses liquid crystal technology that is solid-state and can be all digital. Thus, the present invention eliminates electromechanical tuning. Additionally, in a preferred embodiment, the present invention uses high-speed liquid crystal technology and thus provides rapid full-spectral updates. The present invention has a large aperture, a wide FOV, and is suitable for high spatial resolution imaging. Being based on birefringence it is also suitable for operation in the ultraviolet (UV) through the near infrared (NIR) bands; thus the present invention provides broad spectral coverage. Furthermore, being based on birefringence the present invention is insensitive to free-space pathlength variations; thus it is vibration insensitive with no calibration sources and no synchronization problems. The result is an instrument with a very manufacturable optical head, which gives not only improved peak optical transmission, but an inherent multiplex ability. In brief, a spectrometer based on the PIMS technology of the present invention is an inexpensive, rugged package that can provide rapid high resolution full-spectral updates over a broad spectral range.

SUMMARY OF THE INVENTION

The present invention provides a polarizing interferometer using a zero-order switch, a multi-order switch and an output polarizer to multiplex the recovery of an entire input spectrum. The zero-order switch and multi-order switch require input light of a fixed polarization; thus the present invention provides a preferred embodiment that uses a zero-order switch and a multi-order switch positioned between an input polarizer and an output polarizer. For a sequence of time delays incremented by the multi-order and zero-order switches, the total transmitted power at all wavelengths is measured. From these, the coefficients of a Fourier series representation of the input spectrum are obtained, and the entire spectrum is mathematically reconstructed. Although the structure is similar to a tunable interference filter, the PIMS does not function as a filter, and more particularly, does not scan the transmission wavelength and measure power as a function of wavelength.

The present invention also provides a zero-order switch which has at least four different composite retardance states separated by a quarter-wave of retardation that uses active LC devices to introduce a phase difference between the two light components within the interferometer. The present invention further provides a multi-order switch that uses an active LC device to switch between summing and differencing the retardances of two fixed retarders. The present invention further provides a method of obtaining a Fourier series representation of the spectrum of input light. The present invention, in a preferred use, addresses high-speed imaging applications, including DNA sequencing, chemical analysis, semiconductor process monitoring, machine vision, environmental multi-spectral imaging, and remote sensing of gases.

The present invention can utilize achromatic switchable polarization rotators, achromatic liquid crystal compound retarders, and achromatic passive retarders. Achromatic switchable polarization rotators have recently been described by Sharp (U.S. Pat. No. 5,870,159) and achromatic liquid crystal compound retarders have recently been described by Sharp and Johnson (U.S. Pat. No. 5,658,490), both of which are herein incorporated by reference in their entirety. Chromaticity compensation using multilayers of identical passive retarder material, to create achromatic passive retarders, was addressed by S. Pancharatnam, Proc. Indian Acad. Sci. A41, 137 [1955], by A. M. Title, Appl. Opt. 14, 229 [1975], and C. J. Koester, J. Opt. Soc. Am. 49, 405, [1959], all of which are herein incorporated by reference in their entirety.

A preferred embodiment of the polarizing interferometer multiplex spectrometer utilizes a split zero-order switch comprising a first active LC device, referred to as a quarter-wave switch that switches between a state which yields zero retardance and another which yields a quarter-wave (¼) of retardance, and a second active LC device, referred to as half-wave switch, that switches between a state which yields zero retardance and another which yields a half-wave (½) of retardance. Combinations of the retardances of the quarter-wave switch and half-wave switch yield four composite retardance states $-\lambda/4$, 0, $\lambda/4$, and $\lambda/2$ which are, respectively, equivalent to phase shifts of $-\pi/2$, 0, $\pi/2$, and $\pi$. In a preferred embodiment, the multi-order switch is positioned between the quarter-wave switch and the half-wave switch of the split zero-order switch.

A second embodiment of the zero-order switch comprises a single nematic liquid crystal cell that is a variable retarder electronically tunable over at least a three-quarter wave of retardation. The optic axis of the nematic LC cell zero-order switch is oriented at $\pm\pi/4$ with respect to the polarization of input light. In one embodiment the single LC cell is a nematic LC, but it can be any LC material with a retardance tunable over at least $3\lambda/4$, including $\pi$-cells and homeotropically aligned smectic liquid crystals. For analog operation of the zero-order switch, the retardances need not be separated by a quarter-wave, and the ability to tune over a full wave may be preferred.

A third embodiment of the zero-order switch comprises two half-wave liquid crystal rotatable retarders in combination with a first passive quarter-wave retarder. The LC rotatable retarders are positioned adjacent to either a polarizer or a second passive quarter-wave retarder. To introduce four selectable phase differences between the two light components within the interferometer, the half-wave liquid crystal rotatable retarders are each switchable between two orientation states such that four composite retardance states separated by a quarter-wave result.

A fourth embodiment of the zero-order switch comprises a first liquid crystal variable retarder, with a fixed orientation of $\theta_0=\pm\pi/4$, and a second liquid crystal variable retarder with a fixed orientation parallel or perpendicular to $\theta_0$. The first liquid crystal variable retarder is switchable between zero and a quarter-wave retardance $\lambda/4$, and the second liquid crystal variable retarder is switchable between zero and a half-wave retardance $\lambda/2$. To achieve four selectable phase differences between the two light components within the interferometer, the variable retarders are each switched between retardance states such that four composite retardance states separated by a quarter-wave result.

A preferred embodiment of the multi-order switch comprises a passive retarder followed by n sub-switches, where n is an integer greater than zero and where each sub-switch comprises a half-wave switch followed by a passive retarder. To achieve two or more composite retardance states, the half-wave switches are driven between two states, a summing-state and a differencing-state. In the summing-state, a half-wave switch sums the retardances of adjacent passive retarders, while in the differencing-state a half-wave switch differences the retardances of adjacent passive retarders. This results in $2^n$ possible composite retardance states for the multi-order switch. Further, note that in the switching state having composite orientation $\pm\pi/4$ there also appears a residual retardance of a half-wave (i.e., $\pi$).

A first embodiment of a retarder usable for the quarter-wave switch or half-wave switch comprises a LC polarization rotator (U.S. Pat. No. 5,870,159) in combination with an achromatic quarter-wave retarder oriented parallel or perpendicular to the input light. The relation between polarization rotation and retardance is described by Sharp et al. in U.S. Pat. No. 5,381,253 which is herein incorporated by reference in its entirety. The LC polarization rotator is positioned next to a polarizer, a second passive quarter-wave retarder, or adapted to be positioned adjacent to polarized light. The LC polarization rotator is preferably an achromatic rotator comprising either a passive half-wave retarder and a LC rotatable retarder or two LC variable retarders. In the former configuration, the LC rotatable retarder is driven between two orientation states, an on-state and an off-state. In general, the state of polarization of light is unchanged by a pair of identical retarders with equal retardance and crossed optic axes; thus to achieve a zero phase shift off-state the LC rotatable retarder is oriented perpendicular to the passive half-wave retarder. Consequently, for the off-state the switch introduces no phase shift. For the on-state design criteria are provided that determine the orientations for introducing a desired phase shift. In the embodiment having two variable retarders, the retarders are oriented at the above on-state orientations and are driven simultaneously between two retardation states, a zero state and a half-wave state. To achieve a zero phase shift both LC variable retarders are driven to their zero retardation states; thus, no phase shift is introduced. To achieve the desired on-state phase shift both LC variable retarders are in their half-wave retardation states. Consequently, the LC variable retarders become functionally equivalent to the LC rotatable retarder in the on-state.

A second embodiment of an achromatic retarder usable for the quarter-wave switch or half-wave switch comprises a LC compound retarder (U.S. Pat. No. 5,658,490) that comprises an active LC retarder unit positioned between a first passive retarder of retardance $\Gamma_0$ oriented at $\theta_0$ and a second passive retarder also of retardance $\Gamma_0$ oriented at $\theta_0$. The active LC retarder unit can comprise either a half-wave LC rotatable retarder or a first LC variable retarder and a second LC variable retarder. In the former configuration, the LC rotatable retarder is driven between two orientation states, an on-state and an off-state. The composite orientation of the compound retarder is thereby switched between parallel or perpendicular to and $\pm 45°$ to the input polarization. Design criteria are provided that determine the orientations of the LC rotatable retarder and the retardance and orientations of the passive retarders to yield a desired phase shift. In the latter configuration, one LC variable retarder is oriented at the above on-state orientation while the other LC variable retarder is oriented at the above off-state orientation. The LC variable retarders are driven synchronously between two retardation states, a zero state and a half-wave state. When one LC variable retarder is in the half-wave retardance state the other is in the zero retardance state. To achieve a zero phase shift, the LC variable retarder at the off-state orientation is driven to the half-wave state and the LC variable retarder at the on-state orientation is driven to the zero state. Correspondingly, to achieve the desired phase shift, the LC variable retarder at the off-state orientation is driven to the zero state and the LC variable retarder at the on-state orientation is driven to the half-wave state. In this manner, the LC variable retarders become functionally equivalent to the half-wave LC rotatable retarder.

The half-wave switch utilized in the zero-order switch and multi-order switch may be any of the above described embodiments. However, a most preferred embodiment of the half-wave switch comprises the above described liquid rotatable retarder positioned between a first passive retarder and a second passive retarder.

Other embodiments of the above zero-order switch, multi-order switch, quarter-wave switch and half-wave switch comprise replacing the LC active retarders with patterned passive LC elements such that the domains of the pattern correspond to the various orientation states of the LC rotatable retarder.

BRIEF DESCRIPTION OF THE DRAWINGS

FIG. 2, comprising

FIG. 6, comprising

FIG. 7, comprising FIGS. 7a–g, illustrates various embodiments of the quarter-wave switch, comprising (a) a liquid crystal rotatable retarder followed by a passive retarder, followed by an achromatic quarter-wave retarder, (b) a passive retarder followed by a liquid crystal rotatable retarder, followed by an achromatic quarter-wave retarder, (c) two liquid crystal variable retarders followed by an achromatic quarter-wave retarder, (d) two passive retarders with a liquid crystal rotatable retarder positioned therebetween, and (e) two liquid crystal variable retarders positioned between passive retarders, while (f) illustrates the composite orientation and retardance states of the switches of FIGS. 7a–c, and (g) illustrates the composite retardance and orientation states of the switches of FIGS. 7d–e.

FIG. 8, comprising FIGS. 8a–g, illustrates various embodiments of the half-wave switch, comprising (a) a liquid crystal rotatable retarder followed by a passive retarder, followed by an achromatic quarter-wave retarder, (b) a passive retarder followed by a liquid crystal rotatable retarder, followed by an achromatic quarter-wave retarder, (c) two liquid crystal variable retarders followed by an achromatic quarter-wave retarder, (d) two passive retarders with a liquid crystal rotatable retarder positioned therebetween, and (e) two liquid crystal variable retarders positioned between passive retarders, while (f) illustrates the composite orientation and retardance states of the switches of FIGS. 8a–c, and (g) illustrates the composite retardance and orientation states of the switches of FIGS. 8e–d.

FIG. 9, comprising

FIG. 12, comprising

FIG. 15, comprising

FIG. 16, comprising

DETAILED DESCRIPTION OF THE INVENTION

A. General

Figure 1:
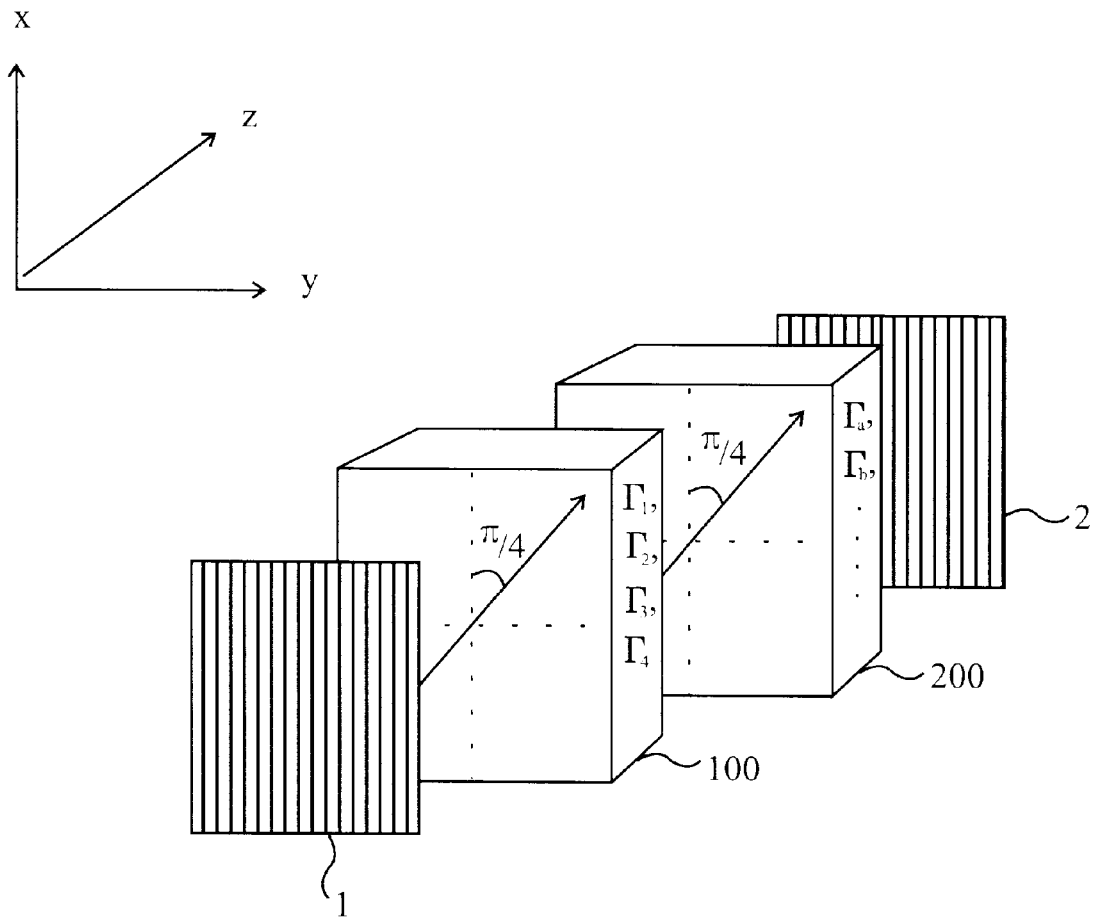
FIG. 1 illustrates a polarizing interferometer multiplex spectrometer comprising a first linear polarizer, a second linear polarizer, a zero-order switch, and a multi-order switch.

The elements in the devices of this invention are optically coupled in series. The orientation of a polarizer refers to the orientation of the transmitting axis, and the orientation of a birefringent optical element refers to the orientation of the principal optic axis. Orientations are herein defined with respect to the transmitting optic axis of an incident polarizer in a plane perpendicular to the light propagation axis or, in the absence of an incident polarizer, the orientation is defined with respect to the polarization of the incident light. In the illustrations of birefringent elements, the orientation is shown by arrow-headed lines and the retardance is labeled on the side of the element. When an element has more than one retardance value, the values are separated by commas. When an element has a fixed orientation angle, the orientation angle is designated by a symbol $\theta$. When an element has more than one orientation, the orientation angles are designated by a symbol $\alpha$.

As used herein, the term "design wavelength" refers to a wavelength at which a single optical element or a group of optical elements has a specified optical property. At other wavelengths, there is a deviation, $\delta$, in the optical property from that at the design wavelength. The term "achromatic"

refers to a single optical element or a group of optical elements with minimal chromaticity, preferably with no first order dependence of the transmitted electromagnetic field on δ, and hence no second order dependence of the transmitted power on δ. The term "composite orientation" refers to the net effective orientation of a single optical element or a group of optical elements. The term "composite retardance" refers to the net effective retardance of a single optical element or a group of optical elements.

As used herein, the term "patterned retarder" refers to a single optical element that has a fixed retardance and a spatial pattern of orientations where a specific part of the pattern is referred to as a domain. The term "rotatable retarder" refers to a single optical element or a group of optical elements with two or more composite orientation states and a fixed composite retardance. The term "variable retarder" refers to a single optical element or a group of optical elements with a two or more composite retardance states and a fixed composite orientation. The term "active retarder," as used herein, refers to either a variable retarder, a rotatable retarder, or a patterned retarder, while the term "passive retarder" refers to a single optical element or a group of optical elements with both a fixed composite retardance and a fixed composite orientation.

The term "quarter-wave switch," as used herein, refers to a single optical element or a group of optical elements which has two switchable states, wherein each of the states provides either a quarter-wave of retardance or no retardance. The term "half-wave switch," as used herein, refers to a single optical element or a group of optical elements which has two switchable states wherein each of said states provides either a half-wave of retardance or no retardance. The term "zero-order switch," as used herein, refers to a single optical element or a group of optical elements that introduces a phase difference between two components of light, at a design wavelength. Finally, the term "multi-order switch," as used herein, refers to a group of optical elements which has fixed orientation and two or more composite retardance states where at least one state has a retardance greater than or equal to a full-wave.

The present invention requires input light of fixed polarization or a means for polarizing the input light, a means for controlling the time delay, a means for changing the phase between two co-linearly propagating orthogonally polarized light components, and a means for analyzing the polarization state of transmitted light. FIG. 1 illustrates a general preferred embodiment of the present invention. In FIG. 1, input light propagates in either the positive or negative z-axis direction. FIG. 1 shows a PIMS comprising a first linear polarizer 1 oriented parallel to the x-axis, a zero-order switch 100 with four retardation states and oriented at π/4 for controlling the phase between the light components, a multi-order switch 200 with two or more retardation states and oriented at π/4 for control of the time delay between the light components, and a second linear polarizer 2 oriented parallel to the x-axis. For input light propagation in the positive z-axis direction, 1 serves as a means for polarizing the input light and 2 analyzes the polarization state of the transmitted light. For input light propagation in the negative z-axis direction, 2 serves as a means for polarizing the input light and 1 analyzes the polarization state of the transmitted light. It should be recognized that FIG. 1 is a general illustration of a PIMS. The positions of the zero-order switch 100 and multi-order switch 200 may be reversed, and the linear polarizers 1 and 2 may be parallel or crossed.

Figures 2A, 2B, 2C:
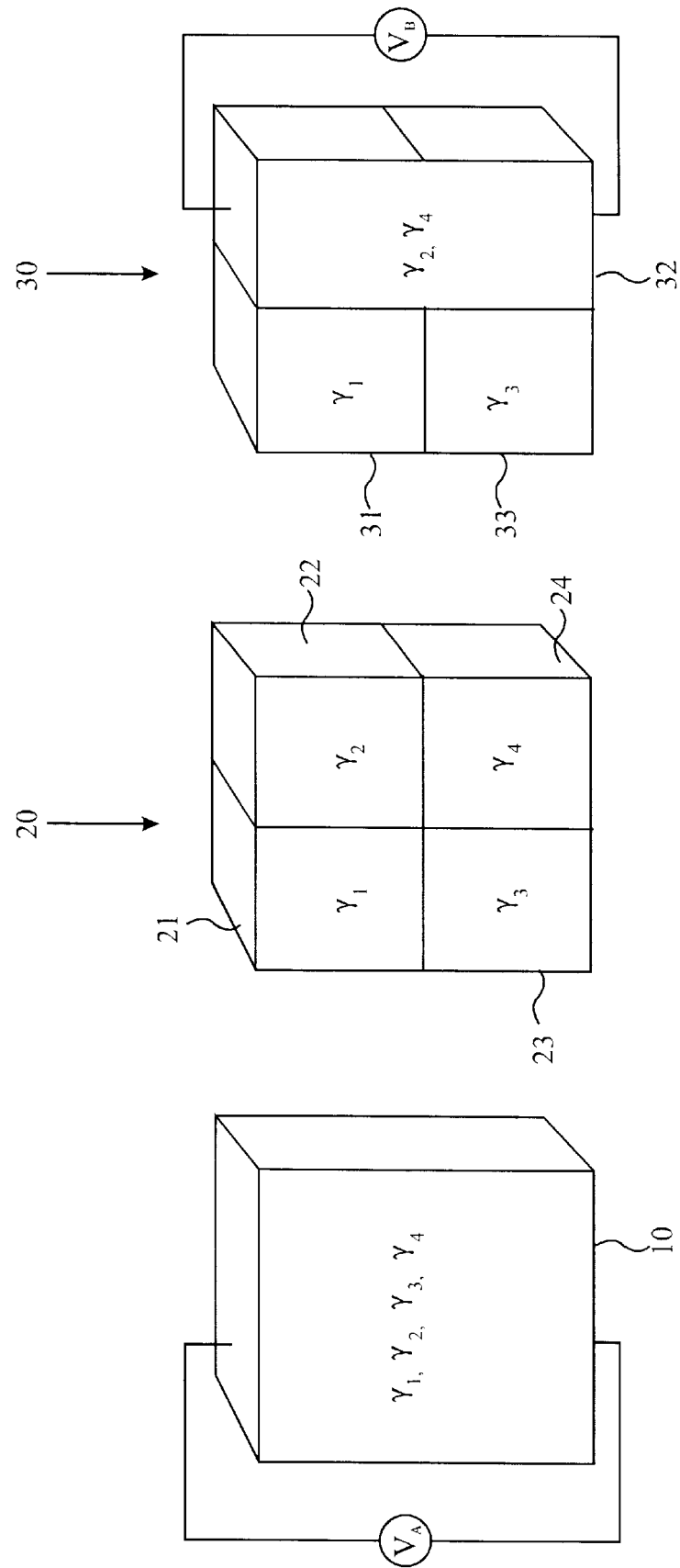
FIGS. 2a–c, illustrates an optical element having (a) a composite retardance switchable between four different optical property states $\gamma_1$, $\gamma_2$, $\gamma_3$, and $\gamma_4$, (b) a spatial pattern of four different optical property states $\gamma_1$, $\gamma_2$, $\gamma_3$, and $\gamma_4$ and (c) one section having a spatial pattern having one domain of optical property $\gamma_1$ and another domain of optical property $\gamma_3$, and another section switchable between optical property states $\gamma_2$ and $\gamma_4$.

The active retarders in this invention are discussed in terms of switches, however, it should be recognized that a switch with n states may be replaced by a patterned element with an n domain pattern. Further, an active retarder that comprises a combination of switches and patterned elements may also be utilized in the present invention. FIG. 2 illustrates that a switch 10, switchable between four states $\gamma_1$, $\gamma_2$, $\gamma_3$, and $\gamma_4$, may be replaced by a patterned retarder 20 that has four domains, 21, 22, 23, and 24, with optical properties that respectively correspond to the four states, $\gamma_1$, $\gamma_2$, $\gamma_3$, and $\gamma_4$, of the switch 10. Further, FIG. 2 illustrates that an active retarder 30 may comprise a combination of switches and patterned retarders. A domain of the patterned retarder may in itself be a switch, e.g., domain 32 is switchable between $\gamma_2$ and $\gamma_4$, which may occur in combination with other domains which are also switches or with domains that have a fixed optical property, e.g., domain 31 is fixed at $\gamma_1$ and domain 33 fixed is at $\gamma_3$. The optical states, $\gamma_n$, can have different orientations or retardances. In particular, liquid crystal polymer retarders can be fabricated having domains with different orientations, as described in Schadt et al., Jpn. J. Appl. Phys. 34, 3240–3249, which is incorporated by reference herein in its entirety.

B. Theory of Operation

The output spectrum generated with a PIMS is a smoothed periodic representation of the original band-limited input spectrum S(ω). The periodicity results from the fact that the autocorrelation of the input light is sampled to recover the spectrum, while the smoothing is due to the limited number of time-samples obtainable in practice. Accordingly, the input spectrum corresponds to a single period of the resulting periodic output spectrum. Moreover, since the output spectrum is periodic, it can be represented as a Fourier series:

$$S(\omega) = A_0 + \sum_{m=1}^{\infty} A_m \cos\left(\frac{2\pi m\omega}{\Delta\omega}\right) + B_m \sin\left(\frac{2\pi m\omega}{\Delta\omega}\right) \quad (2)$$

where Δω is the bandwidth of the input spectrum and the Fourier series coefficients are $$A_0 = \frac{1}{\Delta\omega} \int_{-\frac{\Delta\omega}{2}}^{\frac{\Delta\omega}{2}} S(\omega) d\omega \quad (3)$$

$$B_m = \frac{2}{\Delta\omega} \int_{-\frac{\Delta\omega}{2}}^{\frac{\Delta\omega}{2}} S(\omega) \sin\left(\frac{2\pi m\omega}{\Delta\omega}\right) d\omega \quad (4)$$

$$A_m = \frac{2}{\Delta\omega} \int_{-\frac{\Delta\omega}{2}}^{\frac{\Delta\omega}{2}} S(\omega) \cos\left(\frac{2\pi m\omega}{\Delta\omega}\right) d\omega \quad (5)$$

Figure 3:
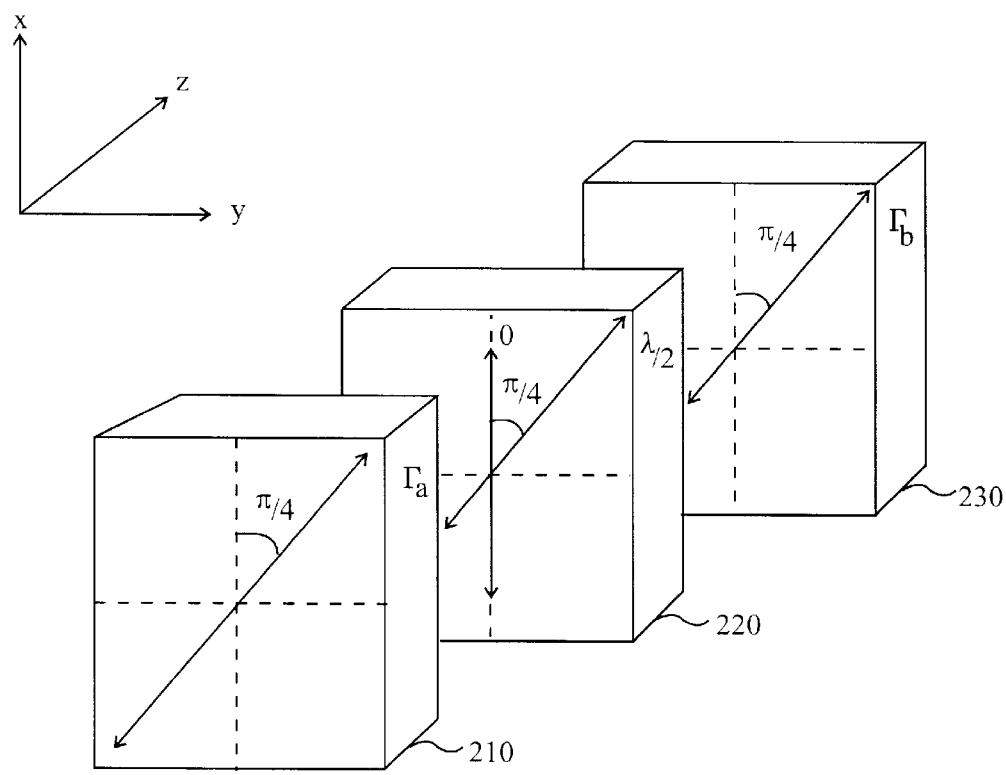
FIG. 3 illustrates a multi-order switch comprising two passive retarders and a half-wave switch positioned therebetween with two composite orientation states such that in one orientation state the composite retardance of the multi-order switch is equal to the sum of the retardances of the passive elements while in the other orientation state, the composite retardance of the multi-order switch is equal to the difference between the retardances of the passive elements.

Now consider the present invention which comprises a zero-order switch that preferably achromatically selects the phase shift Φ and a multi-order switch with selectable retardance states Γ used to vary the time delay of the interferometer. The transmission function, T(ω), of this structure is given by $$T(\omega) = \cos^2\left[\frac{\Gamma(\omega)}{2} + \frac{\phi}{2}\right] \quad (6)$$

where, $$\Gamma(\omega) = \frac{\Delta n d}{c} \omega \qquad (7)$$

is the retardance of a multi-order switch, determined by its composite thickness, d, and composite birefringence, n=(ne−no) and where dispersion of the birefringence is neglected for the moment. Here, c is the free-space speed of light. The present invention provides a multi-order switch as a means for varying the period of the sinusoid. The principle behind a multi-order switch of FIG. 3 is that a half-wave switch, 220, which reorients the polarization by π/2, is equivalent to modulating the passive retarders, 210 and 230, between parallel and crossed orientations. Two retarders with a parallel orientation are equivalent to a single retarder with the sum of their retardances, i.e., $\Gamma_a+\Gamma_b$, while two retarders with crossed orientations are equivalent to a single retarder with the difference of their retardances, i.e., $\Gamma_a-\Gamma_b$. Note, however, that a residual retardance of a half-wave arises in the above sum or difference when the composite orientation is ±π/4. Thus, by modulating the polarization between two passive retarders, 210 and 230, the half-wave switch, 220, non-mechanically sums or differences their retardances.

In a preferred embodiment, a multi-order switch switches the retardation in increments of the fundamental according to $$\Gamma(\omega) = m\tau_0\omega = \frac{2\pi m}{\Delta\omega}\omega \qquad (8)$$

where, $$\tau_0 = \frac{2\pi}{\Delta\omega} \qquad (9)$$

and where Δω is the bandwidth of an input spectrum. Thus, the bandwidth of the input spectrum to be recovered is the criteria that determines the time delay step, $\tau_0$, selected. This is, the autocorrelation is sampled at a sufficient rate that the recovered spectrum is not aliased.

Now consider the effect of a PIMS on an input light spectrum S(ω). The total integrated optical power of the output light, $P_{out}$, is the integral of the input spectrum S(ω) modulated by the transmission function T(ω):

$$P_{out} = \int_0^\infty S(\omega)T(\omega)d\omega \qquad (10)$$

Substituting equations 6 to 9 into equation 10 it follows that the total integrated optical power of the output light is represented by:

$$P_{out} = \int_0^\infty S(\omega)\cos^2\left[\frac{\pi m}{\Delta\omega}\omega + \frac{\phi}{2}\right]d\omega. \qquad (11)$$

Further, when equation 11 is expanded, it yields a constant term and a term that modulates the input spectrum $$P_{out} = \frac{1}{2}\int_0^\infty S(\omega)d\omega + \frac{1}{2}\int_0^\infty S(\omega)\cos\left[\frac{2\pi m}{\Delta\omega}\omega + \phi\right]d\omega. \qquad (12)$$

To recover the input spectrum, the present invention employs a zero-order switch to extract the modulation term in equation 12.

Figure 4:
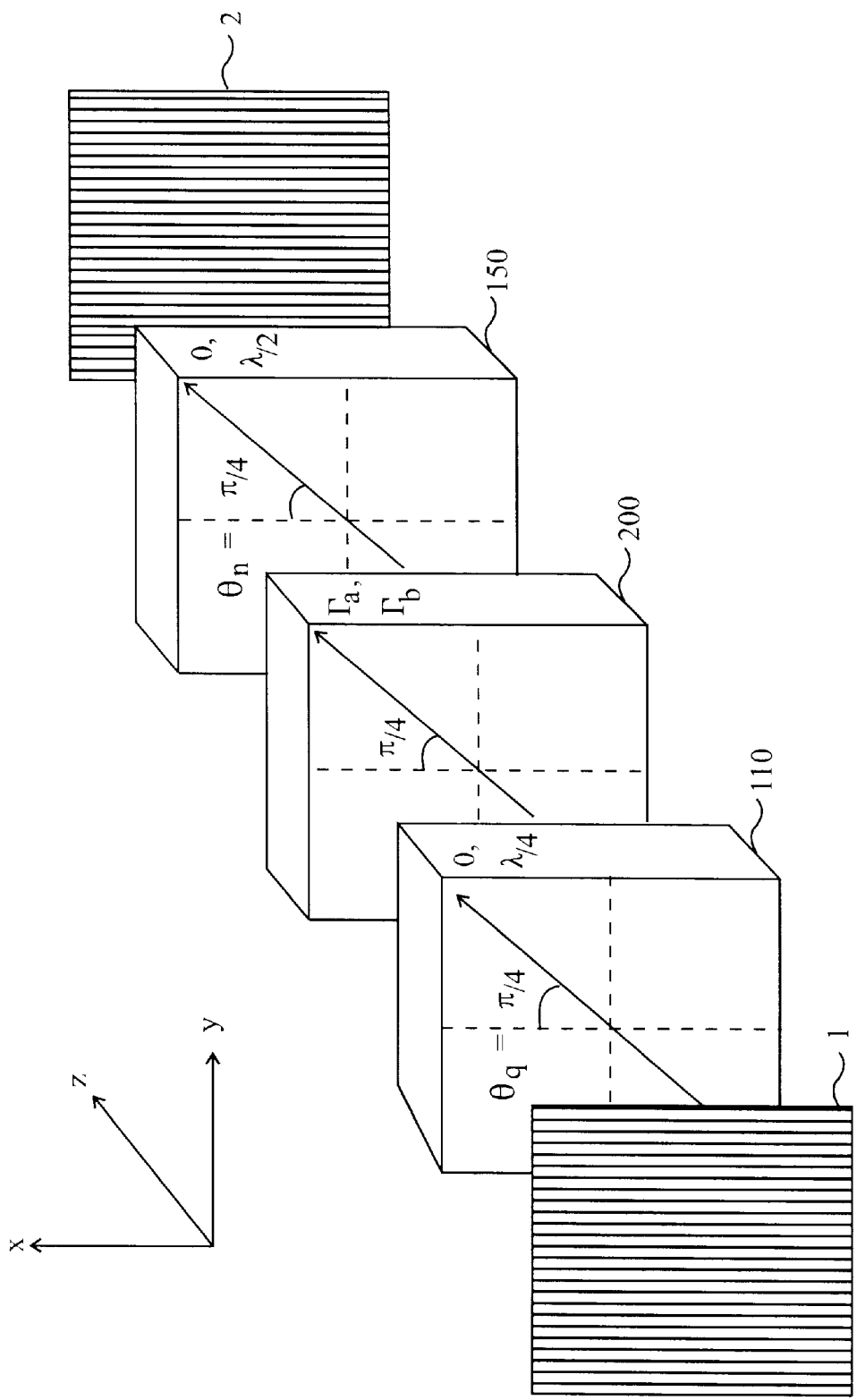
FIG. 4 illustrates a polarization interference multiplex spectrometer comprising a first linear polarizer, a second linear polarizer, a zero-order switch comprised of a quarter-wave switch and a half-wave switch and having a multi-order switch positioned between said switches.

One preferred embodiment of a zero-order switch uses analog LC devices, or combinations of analog and digital LC devices to achieve a full 2π of phase shift. However, a PIMS requires only four non-degenerate phase shift states. In a more preferred embodiment, four phase shifts are generated using two two-state digital LC devices. FIG. 4 illustrates an embodiment where the zero-order switch comprises a quarter-wave switch 110 and a half-wave switch 150 and where the multi-order switch 200 is positioned between 110 and 150. In such an embodiment, the quarter-wave switch 110 is adjacent to one polarizer 1 and has a composite orientation of $\theta_q=\pm\pi/4$ and composite retardance states of zero and a quarter-wave, while the half-wave switch 150 is adjacent to the other polarizer 2 and has a composite orientation of $\theta_h=\pm\pi/4$, and composite retardance states of zero and a half-wave. These composite orientations and retardances as shown in FIG. 4 for the quarter-wave switch 110 and the half-wave switch 150 can be achieved in two ways. A first way utilizes a structure with a fixed orientation and a retardance switchable between the two retardance states. The second way utilizes a structure with a fixed retardance and an orientation that is switchable between an on-state orientation of ±π/4 that results in the desired phase shift, and an off-state orientation of 0 that results in no phase shift.

In a preferred embodiment, the zero-order switch selects the phase shift Φ in increments of π/2 (as is known in the art, a π/2 phase shift corresponds to a phase shift of a quarter-wave, i.e., λ/4). This results in four values of $P_{out}$ for a particular multi-order retardance $$P_m(\phi=0) = \frac{1}{2}\int_0^\infty S(\omega)d\omega + \frac{1}{2}\int_0^\infty S(\omega)\cos\left(\frac{2\pi m}{\Delta\omega}\omega\right)d\omega \qquad (13)$$

$$P_m(\phi=\pi) = \frac{1}{2}\int_0^\infty S(\omega)d\omega - \frac{1}{2}\int_0^\infty S(\omega)\cos\left(\frac{2\pi m}{\Delta\omega}\omega\right)d\omega \qquad (14)$$

$$P_m\left(\phi=\frac{\pi}{2}\right) = \frac{1}{2}\int_0^\infty S(\omega)d\omega + \frac{1}{2}\int_0^\infty S(\omega)\sin\left(\frac{2\pi m}{\Delta\omega}\omega\right)d\omega \qquad (15)$$

$$P_m\left(\phi=-\frac{\pi}{2}\right) = \frac{1}{2}\int_0^\infty S(\omega)d\omega - \frac{1}{2}\int_0^\infty S(\omega)\sin\left(\frac{2\pi m}{\Delta\omega}\omega\right)d\omega. \qquad (16)$$

As can be seen, the phase shift is used to select between orthogonal sinusoids. Hence, the modulation term is extracted by, $$P_m^A = [P_m(\phi=0) - P_m(\phi=\pi)] \qquad (17)$$

$$P_m^B = \left[P_m\left(\phi=\frac{\pi}{2}\right) - P_m\left(\phi=\frac{-\pi}{2}\right)\right]. \qquad (18)$$

to yield two values that represent the even and odd components of the Fourier series of the input spectrum.

$$P_m^A = \int_0^\infty S(\omega)\cos\left[\frac{2\pi m}{\Delta\omega}\omega\right]d\omega = \int_{\omega_0-\frac{\Delta\omega}{2}}^{\omega_0+\frac{\Delta\omega}{2}} S(\omega)\cos\left[\frac{2\pi m}{\Delta\omega}\omega\right]d\omega \qquad (19)$$

and, $$P_m^B = \int_0^\infty S(\omega)\sin\left[\frac{2\pi m}{\Delta\omega}\omega\right]d\omega = \int_{\omega_0-\frac{\Delta\omega}{2}}^{\omega_0+\frac{\Delta\omega}{2}} S(\omega)\sin\left[\frac{2\pi m}{\Delta\omega}\omega\right]d\omega. \quad (20)$$

$$P_m^A = \frac{\Delta\omega}{2}A_m \quad (21)$$

Figure 5:
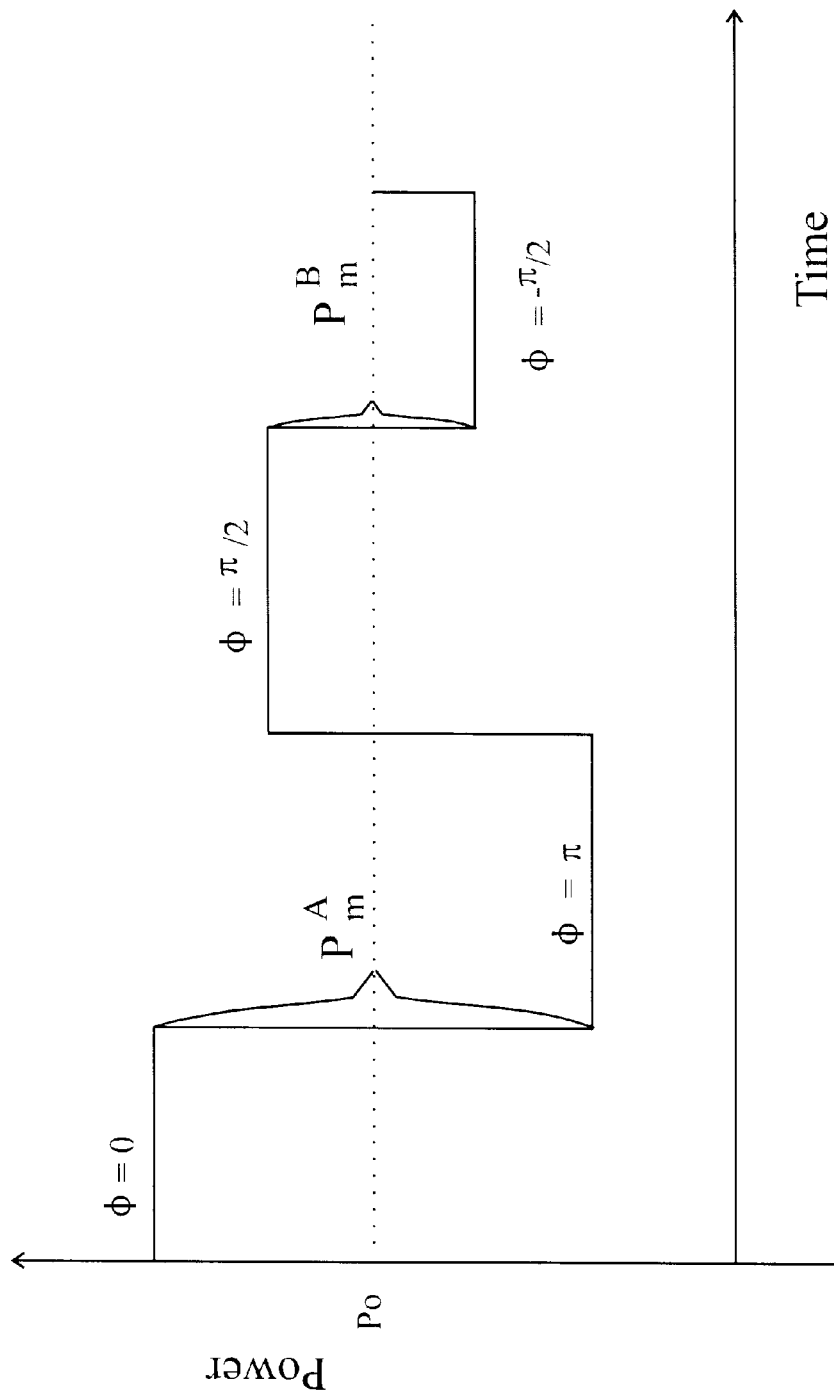
FIG. 5, illustrates the total integrated power of an input spectrum transmitted through a polarizing interferometer multiplex spectrometer as measured at four different phase shifts.

FIG. 5 illustrates typical values of $P_{out}$ as the zero-order switch switches between the four retardation states. The changes in $P_{out}$ occurring with a half-wave shift are proportional to the cosine, $P^A_m$, and sine, $P^B_m$, coefficients, as shown in FIG. 5. The output power is measured over the entire spectral range. The PIMS output is not itself the spectrum, it is used to mathematically reconstruct a spectrum. A mathematical manipulation of these $P_{out}$ values gives the Fourier series coefficient of the input spectrum at this time delay. Thus, $P^A_m$ and $P^B_m$ are proportional to the Fourier series coefficients, $A_m$, $B_m$, respectively $$P_m^B = \frac{\Delta\omega}{2}B_m \quad (22)$$

$$P_0 = \Delta\omega A_0 \quad (23)$$

Figure 6A:
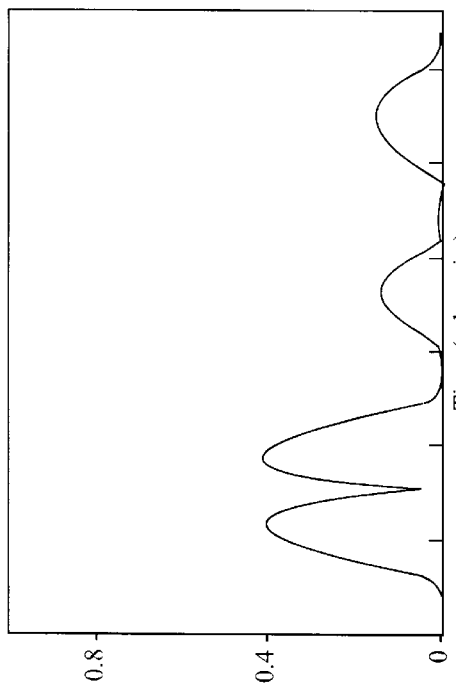
FIGS. 6a–d, illustrates the overlap integral of the polarizing interferometer multiplex spectrometer transmission function with the input spectrum where (a) overlays of the positive cosine modulation term of the transmission function with the input spectrum, (b) shows the product of the input spectrum with this positive cosine modulation term, (c) overlays of the negative cosine modulation term of the transmission function with the input spectrum, and (d) shows the product of the input spectrum with this negative cosine modulation term.
Figure 6B:
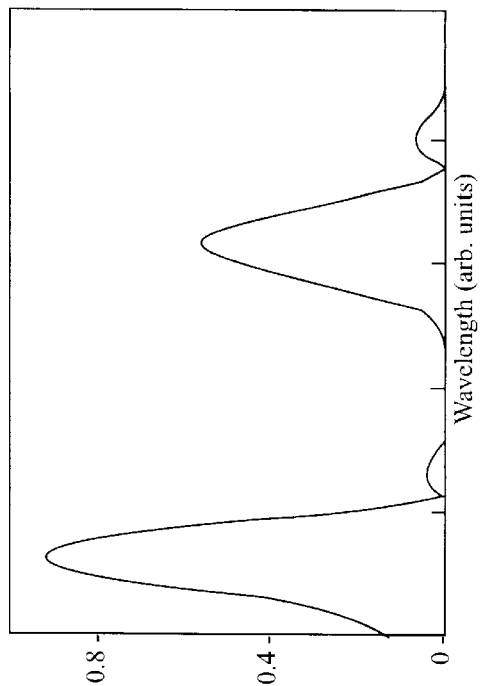
Figure 6C:
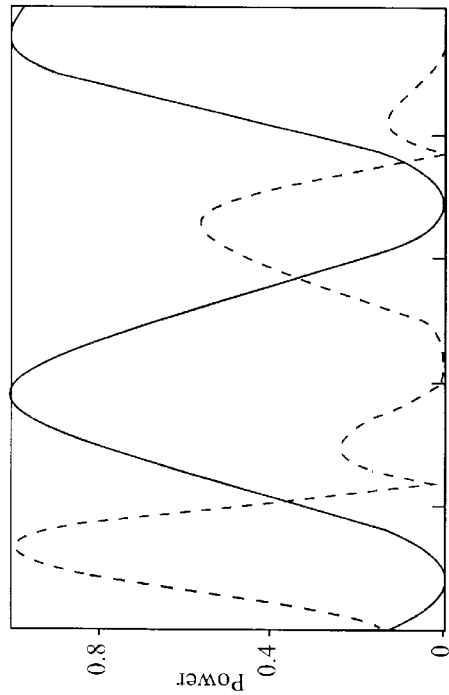
Figure 6D:
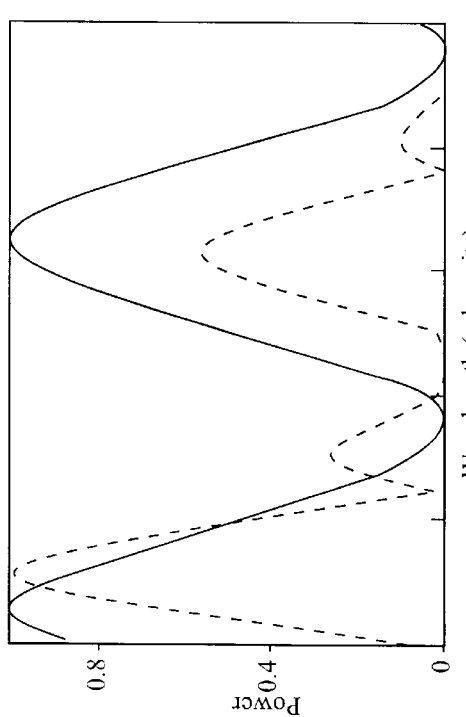

FIGS. 6a–d illustrate the extraction of the input spectrum Fourier series coefficient at a particular time delay of index m. FIG. 6a shows the overlay of the positive cosine modulation term with an arbitrary band-limited input spectrum, cf. equation 13. FIG. 6b shows the product of the input spectrum with this positive cosine modulation term. Thus, the area under the curve of FIG. 6b is given by equation 13. Similarly, FIG. 6c shows the overlay of the negative cosine modulation term with an arbitrary band-limited input spectrum, cf. equation 14, and FIG. 6d shows the product of the input spectrum with this negative cosine modulation term. Therefore, the integral, or area under the curves of FIGS. 6b and 6d, consist of a term which is common to both equations 13 and 14, and one which represents a unique modulation of the spectrum. A simple manipulation of these integrals, see e.g. equations 17, 19 and 21, gives the Fourier series coefficient at this time delay index m.

The input spectrum is reconstructed by assembling the Fourier series using the sequence of $P_{out}$ values $P_m$.

$$S(\omega) = \frac{1}{\Delta\omega}\left[P_0 + 2\sum_{m=1}^{\infty} P_m^A\cos\left(\frac{2\pi m}{\Delta\omega}\omega\right) + P_m^B\sin\left(\frac{2\pi m}{\Delta\omega}\omega\right)\right] \quad (24)$$

The above equations show that a periodic version of a band-limited input spectrum can be reconstructed by obtaining the coefficients of the Fourier series of the spectrum. The present invention provides an apparatus and method for obtaining the Fourier series coefficients of the input spectrum by measuring overlap integrals of the input spectrum with sinusoids. The following describes the structures that allow each of these to be achieved.

This theoretical treatment describes the ideal PIMS. In reality, because of non-ideal aspects of the device, such as imperfect achromaticity of the zero-order switch or the different dispersions of the different materials used for different elements, corrections to the equations may be required for optimum accuracy. In particular, the $P_m$ in equations 13–16 can have cross talk between the time delays. This can introduce error, particularly for slowly varying features in the spectrum. The spectrum can be improved by extracting the autocorrelation at each time delay.

C. Quarter-Wave Switch and Half-Wave Switch Structures

In a preferred embodiment, the present invention utilizes achromatic switchable polarization rotators and achromatic liquid crystal compound retarders to implement the quarter-wave switches and the half-wave switches.

Quarter-wave switches and half-wave switches that utilize switchable polarization rotators are referred to as rotator based switches herein. A rotator based switch is based on the property that a polarization rotator can be converted to a variable retarder using quarter-wave retarders. An achromatic quarter-wave switch or half-wave switch is formed by a LC polarization rotator positioned between a preferably achromatic passive quarter-wave retarder, oriented parallel to the input light, and either a polarizer or a second passive quarter-wave retarder. Achromatic passive retarders, using multilayers of identical passive retarder material for chromaticity compensation, are described in S. Pancharatnam, Proc. Indian Acad. Sci. A41, 137 [1955]; A. M. Title, Appl. Opt. 14, 229 [1975]; and C. J. Koester, J. Opt. Soc. Am. 49, 405, [1959]. When the polarization is rotated a phase shift results, while when the polarization is left at the input orientation of 0 no phase shift results. Achromatic switchable polarization rotators have been described by Sharp (U.S. patent application Ser. No. 08/549,963; Filed Oct. 30, 1995) and design criteria for implementation of rotators are given therein.

In a first embodiment, the LC polarization rotator comprises a passive half-wave retarder oriented at $\theta$ and a LC rotatable retarder with a first orientation state $\alpha$ and a second orientation state $\alpha'$. In such an embodiment, the LC rotatable retarder is driven between the two orientation states, one corresponding to an on-state and the other an off-state. In the off-state, the LC rotatable retarder is oriented perpendicular to the passive half-wave retarder; thus the state of polarization is unchanged by the combination. Consequently, the phase difference and time delay between the light components is unchanged. In the on-state, the orientation of the passive half-wave retarder and the LC rotatable retarder differ by $\pm 2\beta$ and the state of polarization of the input light is rotated by $\beta$. It should be noted that U.S. patent application Ser. No. 08/549,963 provides further design criteria for design optimization. For example, this reference teaches that optimum orientations of the elements of a LC polarization rotator may differ from the design criteria herein by a small angle. All the angles given herein are approximations. To optimize performance for a particular application they can be varied by several degrees.

Figure 7A:
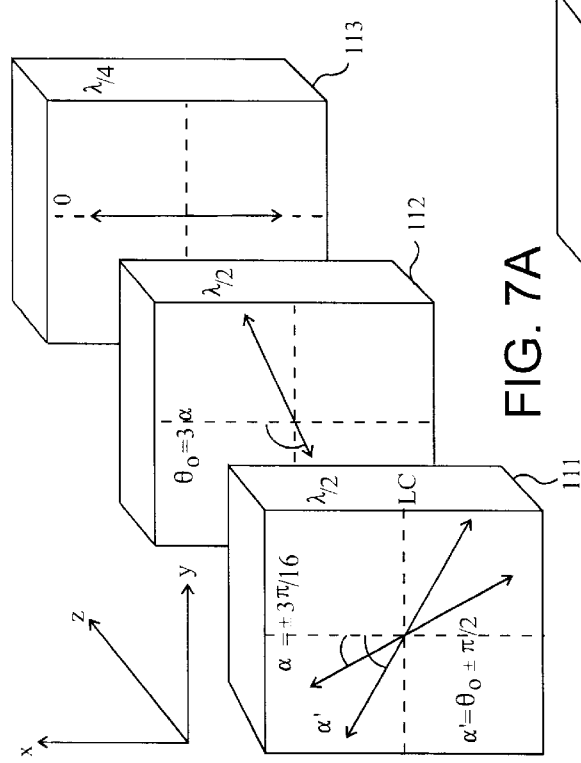
Figure 7B:
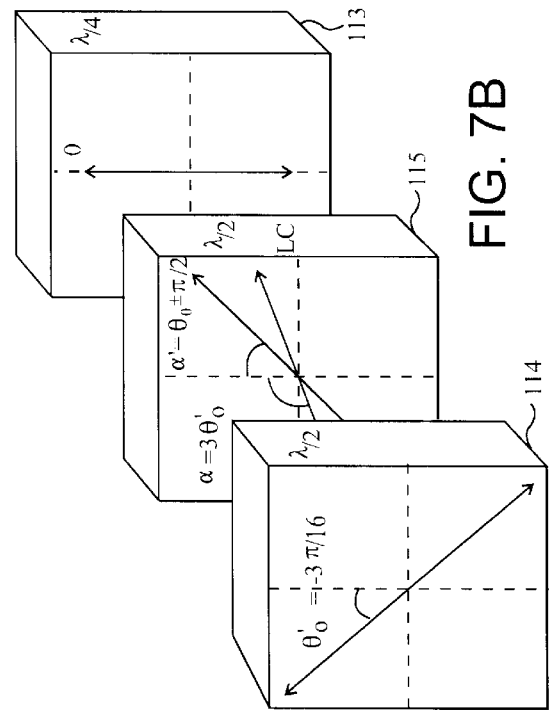
Figure 7C:
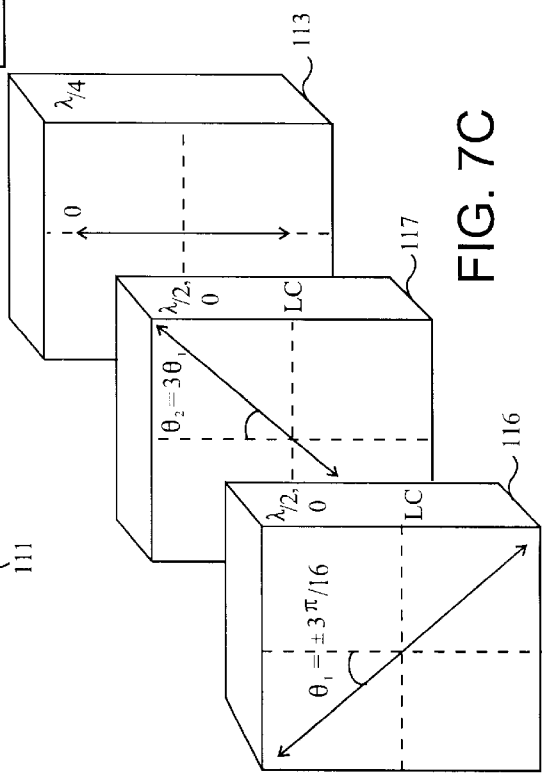

FIGS. 7a–c show a rotator based quarter-wave switch with composite retardance states and composite orientation as shown in FIG. 7f. FIG. 7a shows a preferred embodiment of a quarter-wave switch comprising a passive half-wave retarder, 112 oriented at $\theta_0=3\alpha$, positioned between an achromatic quarter-wave passive retarder 113 oriented at 0° and a half-wave LC rotatable retarder 111 oriented at $\alpha=\pm 3\pi/16$ in an on-state and $\alpha'=\theta_0\pm\pi/2$ in an off-state. In such an embodiment, the composite retardance is $\lambda/4$ in the on-state and 0 in the off-state as shown in FIG. 7f. The quarter-wave retarder is preferably a compound achromatic retarder. Element 113 illustrates the composite orientation and retardance.

FIG. 7b shows a preferred embodiment of a quarter-wave switch comprising a half-wave LC rotatable retarder 115 oriented at $\alpha=3\theta_0$ in an on-state and $\alpha'=\theta_0\pm\pi/2$ in an off-state, positioned between an achromatic quarter-wave passive retarder 113 oriented at 0° and a passive half-wave retarder, 114, oriented at $\theta_0=-3\pi/16$. In such an embodiment, the composite retardance is $\lambda/4$ in the on-state and 0 in the off-state as shown in FIG. 7f.

FIGS. 8a–c show a rotator based half-wave switch with composite retardance states and composite orientation as shown in FIG. 8f. FIG. 8a shows a preferred embodiment of a half-wave switch comprising a passive half-wave retarder, 152 oriented at $\theta_0=3\alpha$, positioned between an achromatic quarter-wave passive retarder 113 oriented at 0° and a half-wave LC rotatable retarder 151 oriented at $\alpha=\pm\pi/8$ in an on-state and $\alpha'=\theta_0\pm\pi/2$ in an off-state. In such an embodiment, the composite retardance is $\lambda/2$ in the on-state and 0 in the off-state as shown in FIG. 8f.

FIG. 8b shows a preferred embodiment of a half-wave switch comprising a half-wave LC rotatable retarder 155 oriented at $\alpha=3\theta_0$ in an on-state and $\alpha'=\theta_0\pm\pi/2$ in an off-state, positioned between an achromatic quarter-wave passive retarder 113 oriented at 0° and a passive half-wave retarder, 154, oriented at $\theta_0=\pm\pi/8$. In such an embodiment, the composite retardance is $\lambda/2$ in the on-state and 0 in the off-state as shown in FIG. 8f.

In a second embodiment of a rotator based switch, the LC polarization rotator comprises a first half-wave LC variable retarder oriented at $\theta_1$ and a second half-wave LC variable retarder oriented at $\theta_2$. In such an embodiment, the half-wave LC variable retarders are oriented at the above on-state orientations for a LC polarization rotator, i.e., $\theta_1-\theta_2=2\beta$. In the off-state both LC variable retarders are driven to their zero retardation states; thus, no phase shift or time delay is introduced. In the on-state, both half-wave LC variable retarders are driven to their half-wave retardation states. Consequently, the light's state of polarization is rotated by $\beta$. It should be noted that U.S. Pat. No. 5,870,159 provides further design criteria for design optimization.

FIG. 7c shows this embodiment of a rotator based quarter-wave switch comprising a first half-wave LC variable retarder 117 oriented at $\theta_2=3\theta_1$ with a retardance of $\lambda/2$ in an on-state and 0 in an off-state, positioned between an achromatic quarter-wave passive retarder 113 oriented at 0° and a second half-wave LC variable retarder 116 oriented at $\theta_1=\pm 3\pi/16$ with a retardance of $\lambda/2$ in an on-state and 0 in an off-state,. In such an embodiment, the composite retardance is $\lambda/4$ in the on-state and 0 in the off-state as shown in FIG. 7f.

FIG. 8c shows this embodiment of a rotator based half-wave switch comprising a first half-wave LC variable retarder 157 oriented at $\theta_2=3\theta_1$ with a retardance of $\lambda/2$ in an on-state and 0 in an off-state, positioned between an achromatic quarter-wave passive retarder 113 oriented at 0° and a second half-wave LC variable retarder 156 oriented at $\theta_1=\pm\pi/8$ with a retardance of $\lambda/2$ in an on-state and 0 in an off-state,. In such an embodiment, the composite retardance is $\lambda/2$ in the on-state and 0 in the off-state as shown in FIG. 8f.

Quarter-wave switches and half-wave switches that utilize liquid crystal compound retarders are referred to as retarder based switches herein. Achromatic liquid crystal compound retarders have been described by Sharp and Johnson, U.S. Pat. No. 5,658,490, and design criteria for implementation of a quarter-wave switch or half-wave switch are given therein. In brief, an achromatic LC compound retarder comprises an active LC retarder positioned between a first passive retarder oriented at $\theta_0$ and a second passive retarder oriented at $\theta_0'$. The passive retarders are equal in retardance, $\Gamma_0$, and oriented parallel to each other. For a composite retardance $\Gamma$, the retardance of the passive retarders $\Gamma_0$, is determined from $$\cos(\Gamma/2)=(\pi/2)(\sin\Gamma_0)/(\Gamma_0) \qquad (25)$$

For achromaticity of the composite orientation and retardance, one solution for the relative orientation, $\Delta$, of the active LC retarder and the passive retarders is:

$$\cos(2\Delta)=-\pi/(2\Gamma_0) \qquad (26)$$

Further, the composite orientation of an achromatic LC compound retarder, $\Omega+\theta_0$, is obtained from $$\tan(2\Omega)=(\tan 2\Delta)/(\cos\Gamma_0) \qquad (27)$$

In a first embodiment, the active LC retarder comprises a half-wave LC rotatable retarder with a first orientation state $\alpha$, corresponding to an on-state that yields a composite retardance $\Gamma$ oriented at $\pm 45°$, and a second orientation state $\alpha'$ that yields the same composite retardance but with an orientation of 0° or 90°, corresponding to an off-state. In the on-state both the orientation and retardance are achromatic. In the off-state only the orientation need be achromatic. In such an embodiment, $\Delta=\theta_0-\alpha$, and $\Omega+\theta_0=45°$. To determine the two solutions for $\alpha'$, $\Delta'=\theta_0-\alpha'$ is substituted for $\Delta$ in equation 26 and $\Omega'=-\alpha'$ is substituted for $\Omega$ in equation 27. It should be noted that U.S. Pat. No. 5,658,490 provides further design criteria for design optimization.

FIGS. 7d–e show a retarder based quarter-wave switch with composite orientation states and composite retardance as shown in FIG. 7g. FIG. 7d shows a embodiment of a quarter-wave switch comprising a half-wave LC rotatable retarder 122 oriented at $\alpha=85°$ in an on-state and $\alpha'=110°$ in an off-state, positioned between a first passive retarder 121 of retardance $8\lambda/25$ and oriented at $\theta_0=14°$ and a second passive retarder, 123, also of retardance $8\lambda/25$ and oriented at $\theta_0 14°$. In such an embodiment, the composite retardance is $\lambda/4$ and the orientation is $\pi/4$ in the on-state and 0 in the off-state, as shown in FIG. 7g. Since the devices of FIGS. 7d and 7e perform the same function, both are referred to as having composite orientation $\pi/4$ and composite retardance switchable between 0 and $\lambda/4$.

FIGS. 8d–e show a retarder based half-wave switch with composite orientation states and composite retardance as shown in FIG. 8g. FIG. 8d shows an embodiment of a half-wave switch comprising a half-wave LC rotatable retarder 162 oriented at $\alpha=\theta_0+\pi/3$ in an on-state and $\alpha'=\alpha+\pi/4$ in an off-state, positioned between a first passive retarder 161 of retardance $\lambda/2$ and oriented at $\theta_0=\pi/12$ and a second passive retarder, 163, also of retardance $\lambda/2$ and oriented at $\theta_0=\pi/12$. In such an embodiment, the composite retardance is $\lambda/2$ and the orientation is $\pi/2$ in the on-state and 0 in the off-state, as shown in FIG. 8g.

In a second embodiment the active LC retarder comprises a first half-wave LC variable retarder oriented at $\theta_1$ with a retardance $\Gamma_1$ switchable between $\lambda/2$ in a first state and 0 in a second state, and a second half-wave LC variable retarder oriented at $\theta_2$, with a retardance $\Gamma_1$ switchable between 0 in a first state and $\lambda/2$ in a second state. In such an embodiment, $\Delta=\theta_0-\theta_1$, and $\Omega+\theta_0=45°$. To determine the two solutions for $\alpha'$, $\Delta'=\theta_0-\theta_2$ is substituted for $\Delta$ in equation 26 and $\Omega'=-\theta_2$ is substituted for $\Omega$ in equation 27. To achieve an on-state that yields a composite retardance $\Gamma$, the variable retarders are driven such that $\Gamma_1=\lambda/2$, $\Gamma_2=0$. Correspondingly, to achieve an off-state that yields a composite retardance of 0, the variable retarders are driven such that $\Gamma_1=0$, $\Gamma_2=\lambda/2$. It should be noted that U.S. Pat. No. 5,658,490 provides further design criteria for design optimization.

FIG. 7e shows a preferred embodiment of a quarter-wave switch comprising a first LC variable retarder 124 oriented at $\theta_1=85°$ with a retardance of $\lambda/2$ in an on-state and 0 in an off-state and a second half-wave LC variable retarder 125 oriented at $\theta_2=110°$ with a retardance of 0 in an on-state and $\lambda/2$ in an off-state, where the LC variable retarders are positioned between a first passive retarder 121 and a second passive retarder 123 both oriented at $\theta_0=14°$ and with a retardance of $8\lambda/25$. In such an embodiment, the composite retardance is $\lambda/4$ and the orientation is $\pi/4$ in the on-state and 0 in the off-state, as shown in FIG. 7g.

FIG. 8e shows a preferred embodiment of a half-wave switch comprising a first LC variable retarder 164 oriented at $\theta_1=\theta_0\pm\pi/3$ with a retardance of $\lambda/2$ in an on-state and 0 in an off-state and a second half-wave LC variable retarder 165 oriented at $\theta_2=\theta_1\pm\pi/4$ with a retardance of 0 in an on-state and $\lambda/2$ in an off-state, where the LC variable retarders are positioned between a first passive retarder 161 and a second passive retarder 163 both oriented at $\theta_0\pm\pi/12$ and with a retardance of $\lambda/2$. In such an embodiment, the composite retardance is $\lambda/2$ and the orientation is $\pi/4$ in the on-state and 0 in the off-state, as shown in FIG. 8g.

D. Zero-order switch

A preferred embodiment of a zero-order switch utilizes two two-state achromatic switches, a quarter-wave switch and a half-wave switch. In such an embodiment, the quarter-wave switch can comprise any of the structures shown in FIG. 7 and the half-wave switch may comprise any of the structures shown in FIG. 8.

In a preferred embodiment the zero-order switch comprises the quarter-wave switch of FIG. 7a and the half-wave switch of FIG. 8d. Such an embodiment provides very achromatic phase shifts. Such an embodiment obtains the best performance by splitting the zero-order switch, as illustrated in FIG. 4, so that the half-wave switch 150 is adjacent to one polarizer, and the quarter-wave switch 110 is adjacent to the other.

Figure 9A:
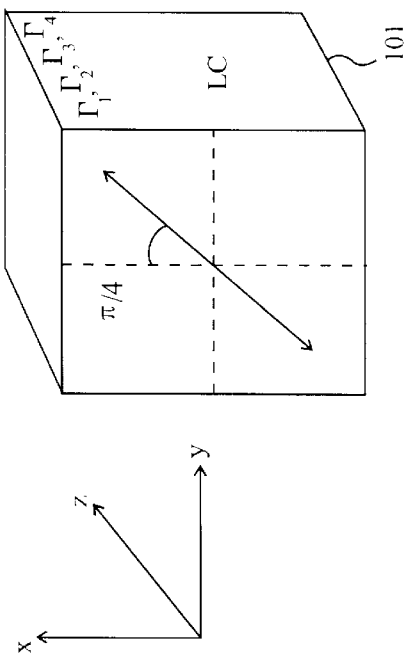
FIGS. 9a–c, illustrates a zero-order switch comprising, (a) a nematic liquid crystal having at least four different composite retardance states that together span at least a three-quarter wave of retardation, (b) two liquid crystal variable retarders, and (c) two liquid crystal rotatable retarders and an achromatic quarter-wave passive retarder.

FIG. 9a illustrates another embodiment of a zero-order switch comprising a single variable retarder 101 oriented at $\pm\pi/4$. In such an embodiment, 101 is tunable over at least a three-quarter wave of retardance and, if digital, is preferably tunable through at least four equally separated retardation states $\Gamma_1$, $\Gamma_2$, $\Gamma_3$, and $\Gamma_4$, which span at least a three quarter-wave of retardation. For analog cells a full wave of tuning is preferred.

Figure 9B:
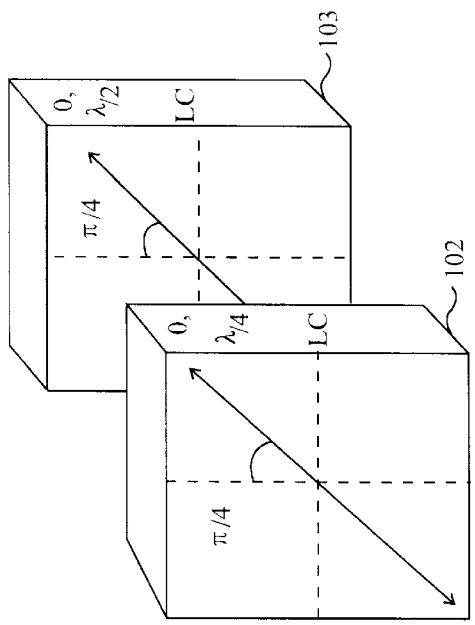

FIG. 9b illustrates another preferred embodiment of a zero-order switch comprising two LC variable retarders 102 and 103 oriented at $+\pi/4$. However, 102 and 103 may be independently oriented at $\pm\pi/4$. In such an embodiment, 102 is switchable between 0 retardance, in a first state, and $\lambda/4$ retardance, in a second state, while 103 is switchable between 0 retardance, in a first state, and $\lambda/2$ retardance, in a second state.

Figure 9C:
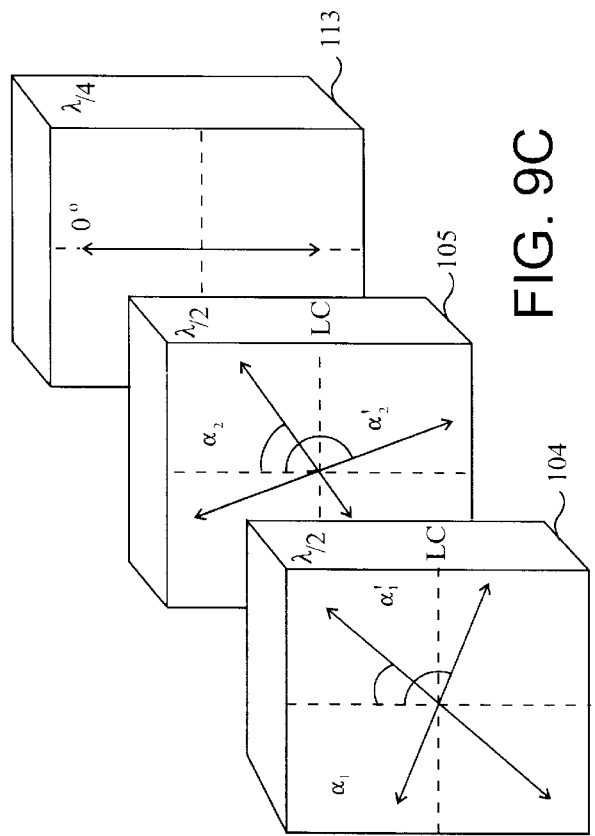

FIG. 9c illustrates another preferred embodiment of a zero-order switch comprising two half-wave LC rotatable retarders, 104 and 105, and an achromatic quarter-wave retarder 113 oriented at 0°. The rotatable orientation states of 104, $\alpha_1$ and $\alpha'_1$, and the rotatable orientation states of 105, $\alpha_2$ and $\alpha'_2$, are chosen such that four non-degenerate composite retardation states are resultant that span at least a three quarter-wave of retardation.

E. Multi-Order Switch

FIG. 3 shows a multi-order switch with a single sub-switch, i.e., n=1. The principle behind a multi-order switch of FIG. 3 is that switching half-wave switch, 220, which changes the handedness of elliptical polarization, is equivalent to modulating the passive retarders, 210 and 230, between parallel and crossed orientations. Two retarders with a parallel orientation are equivalent to a single retarder with the sum of their retardances, i.e., $\Gamma_a+\Gamma_b$, while two retarders with crossed orientations are equivalent to a single retarder with the difference of their retardances, i.e., $\Gamma_1-\Gamma_6$. Thus, by modulating the polarization between two passive retarders, 210 and 230, the half-wave switch, 220, non-mechanically sums or differences their retardances. Note, however, that a residual retardance of a half-wave arises when the achromatic half-wave retarder is oriented at $\pm\pi/4$. In the example of FIG. 3, the summed retardance is $\Gamma_a+\Gamma_b+\pi$. The multi-order switch allows arbitrarily large retardances to be modulated using only half-wave switches. Furthermore, the use of smectic liquid crystals in the half-wave switch allows rapid modulation, which could not be achieved with a nematic LC variable retarder.

Figure 10A:
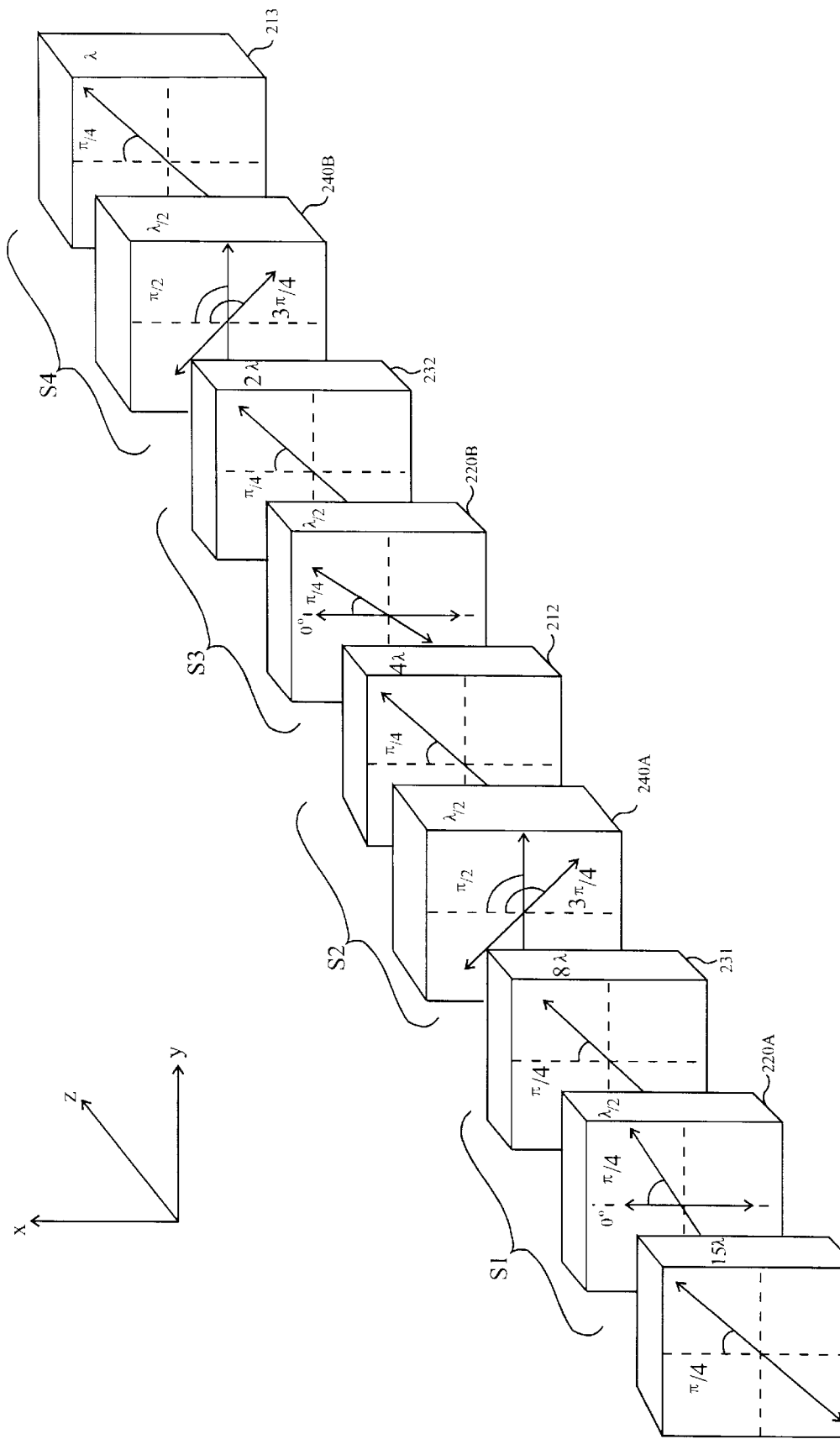
FIG. 10, comprising FIGS. 10a–b, (a) is a multi-order switch comprising a passive retarder and four sub-switches, and (b) is a multi-order switch comprising a passive retarder and two sub-switches where the half-wave switches of the sub-switches are each comprise two passive half-wave retarders with a liquid crystal rotatable retarder positioned therebetween.

FIG. 10a shows a preferred embodiment of a multi-order switch which comprises a passive retarder 211 and four (n=4) sub-switches S1–S4 each comprising a LC half-wave switch and a passive retarder. The sub-switches S1–S4 are comprised of 220A and 231, 240A and 212, 220B and 232, and 240 and 213, respectively. Here, the passive retarders, 211, 231, 212, 232, and 213, are oriented at $+\pi/4$ or $-\pi/4$. The $\pm\pi/4$ orientation of the passive retarders 211, 231, 212, 232, and 213 represents a 50:50 beam splitting arrangement, as the linear input light polarization has equal projections along the crystal Eigenstates. As FIG. 10a shows, the half-wave switches 220A, 240A, 220B, and 240B alternate in composite orientation such that each switch is crossed with the adjacent switches. This ensures that the residual retardance due to the half-wave switches, in any of the sixteen switched states, is minimized. When the half-wave switches use smectic LC cells, the preferred switching sequence has similar switching frequencies for all the LC cells.

Each embodiment of a multi-order switch depends upon the selection of passive retarder retardances and orientations ($\pm\pi/4$), as well as the design and optimum orientation of the half-wave switches. The retardation values can be determined by identifying the sequence of time delays required in order to construct a Fourier series (or equivalently sample the autocorrelation at regular intervals). FIG. 10a shows a preferred sequence of time delays beginning with zero time delay and a sequence of passive retarder thicknesses that is very nearly geometrical, i.e., 211 has a retardance of $15\lambda$, 231 has a retardance of $8\lambda$, 212 has a retardance of $4\lambda$, 232 has a retardance of $2\lambda$, and 213 has a retardance of $1\lambda$. This is because this embodiment is design so that the combinations of the $2^n$ sum/differences of the retarder time delays yield an arithmetic series $(0, \tau_0, 2\tau_0, 3\tau_0 \ldots (2^n-1)\tau_0)$. The preferred time delay step, $\tau_0$, depends upon the bandwidth of the spectrum to be recovered. That is, the autocorrelation is sampled at a sufficient rate that the periodic recovered spectrum is not aliased. It should be noted that the above ordering of passive retarder retardances in a progression of decreasing retardance from one end of the PIMS to the other is only one possible configuration. Other embodiments which are spectrally equivalent can have significantly different configurations.

Figure 10B:
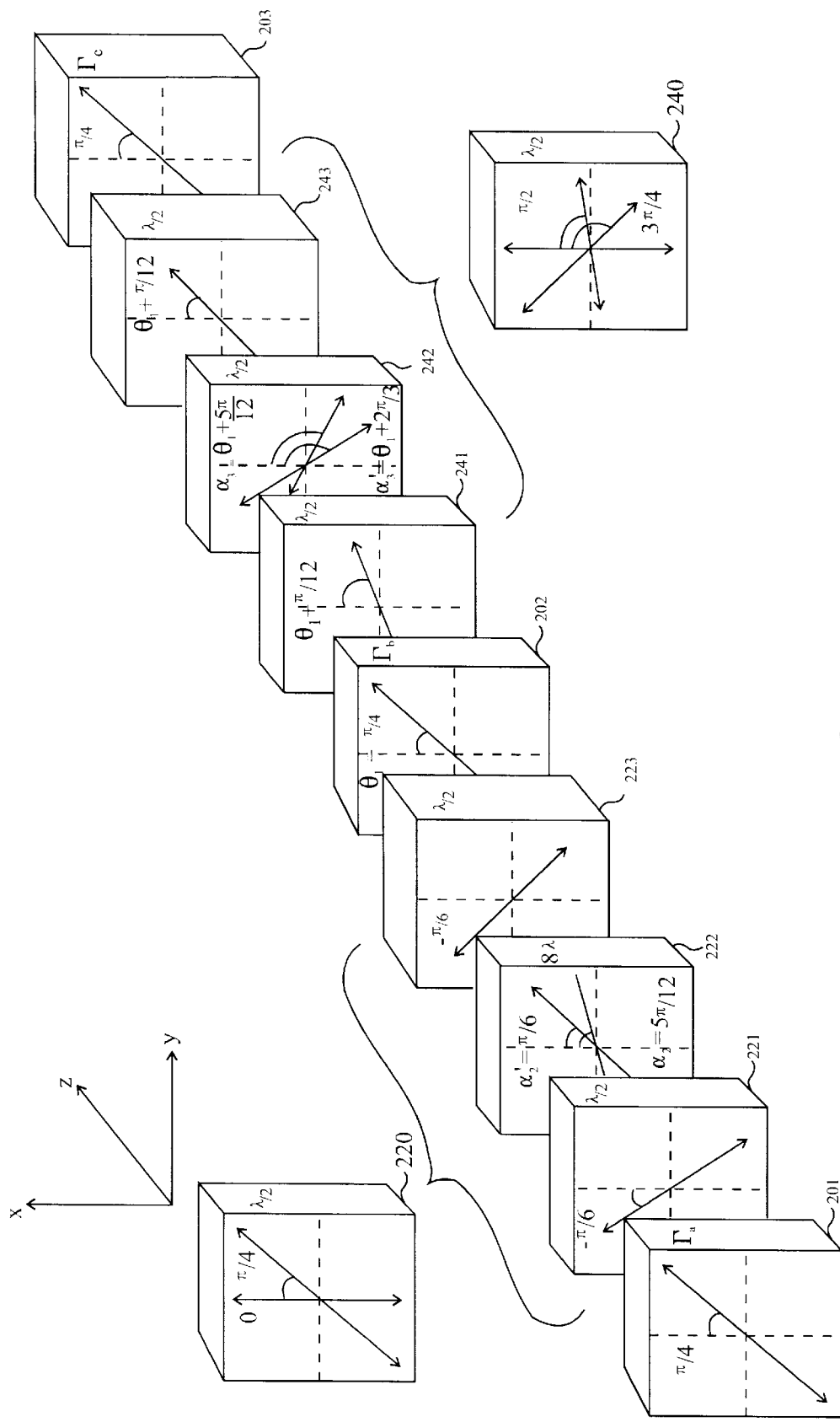

FIG. 10b shows a multi-order switch with a preferred embodiment of the half-wave switches. The elements comprising two half-wave switches, 220 and 240, are shown disposed between passive retarders, 201, 202, and 203. The orientations and retardances shown for the half-wave switch elements (elements 221, 222, and 223 for switch 220 and elements 241, 242, and 243 for switch 240) are those that produce the most achromatic composite multi-order switch retardance when the composite orientation is 0. The switch is achromatic in orientation at a composite orientation of $\pm45°$. The achromatic switch configurations are: (1) for half-wave switch 220 a half-wave rotatable retarder 222 oriented at $\alpha_2=5\pi/12$ in the on-state and $\alpha'_2=\pi/6$ in the off-state positioned between two half-wave passive retarders, 221 and 223, oriented at $-\pi/6$, and (2) for half-wave switch 240 a half-wave rotatable retarder 242 oriented at $\alpha_3\theta_1+5\pi/12$ in the on-state and $\alpha'_3=\theta_1+2\pi/3$ in the off-state positioned between two half-wave passive retarders, 241 and 243, oriented at $\theta_1+\pi/12$. The half-wave switches 220 and 240 can be oriented between passive retarders which are parallel.

EXAMPLE 1

Performance Characteristics of a PIMS

Figure 11:
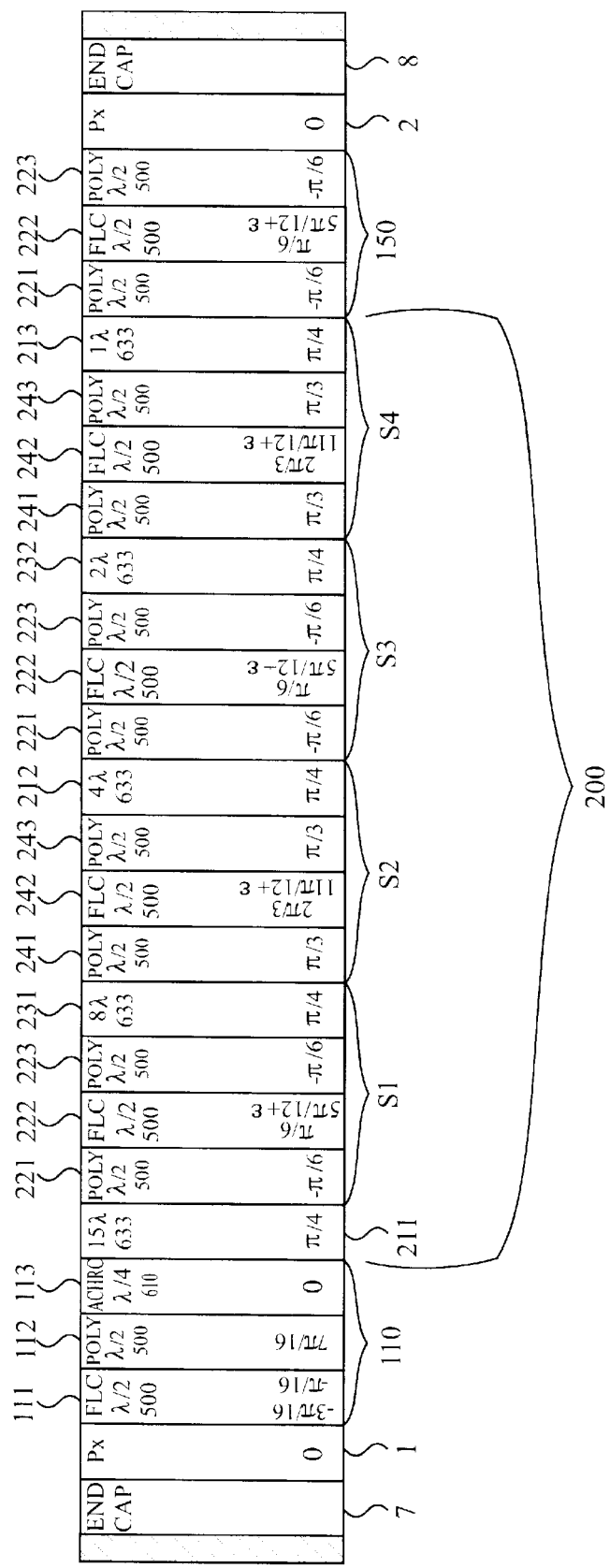
FIG. 11 illustrates a preferred embodiment of the polarizing interferometer multiplex spectrometer comprising a first end cap, a second end cap, a first linear polarizer, a second linear polarizer, a zero-order switch comprised of an achromatic quarter-wave switch and an achromatic half-wave switch, and a multi-order switch positioned between the abovesaid switches comprised of a passive retarder and four sub-switches.
Figure 12A:
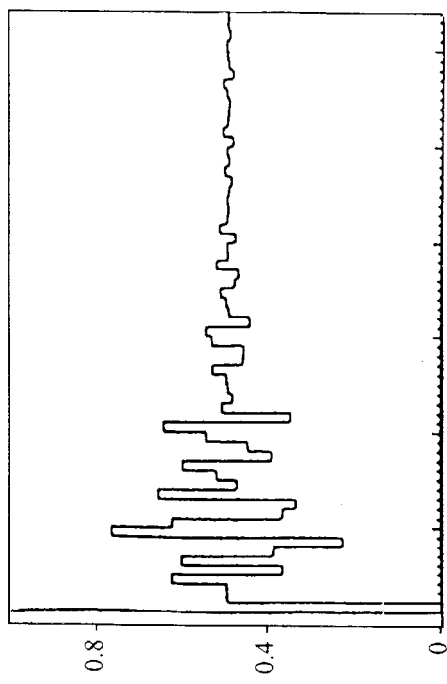
FIGS. 12a–d, illustrates the performance of a polarizing interferometer multiplex spectrometer, where (a) is the input spectrum, (b) is the total integrated power of the transmitted spectrum at four different phases shifts and for sixteen different orders m, (c) is a comparison of the recovered spectrum for m−16 (solid line) and the input spectrum (dashed line), (d) is a comparison of the recovered input spectrum for m=64.
Figure 12B:
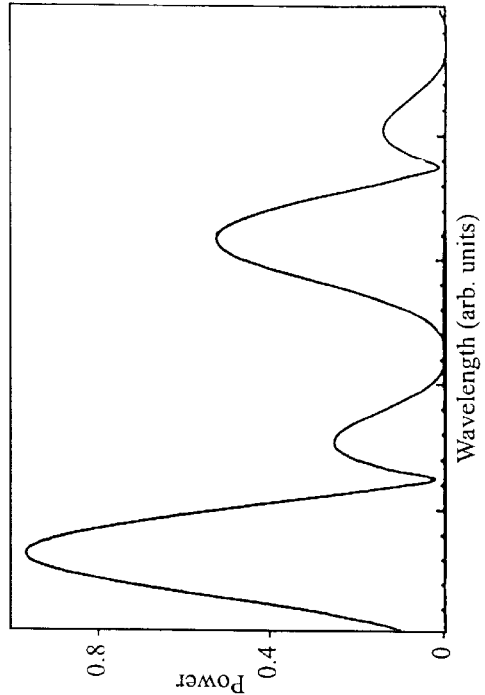
Figure 12C:
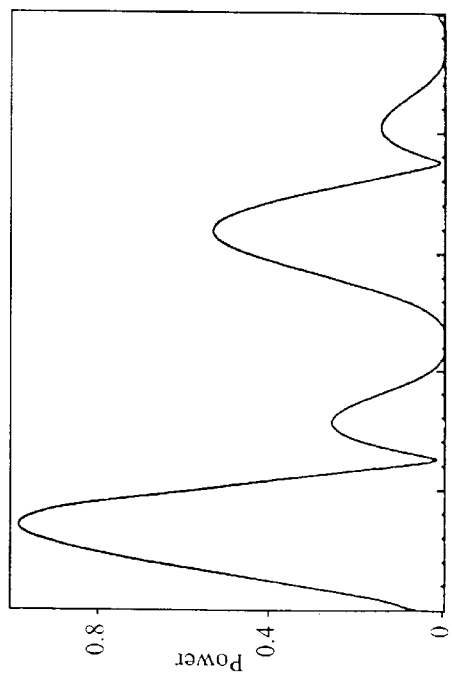
Figure 12D:
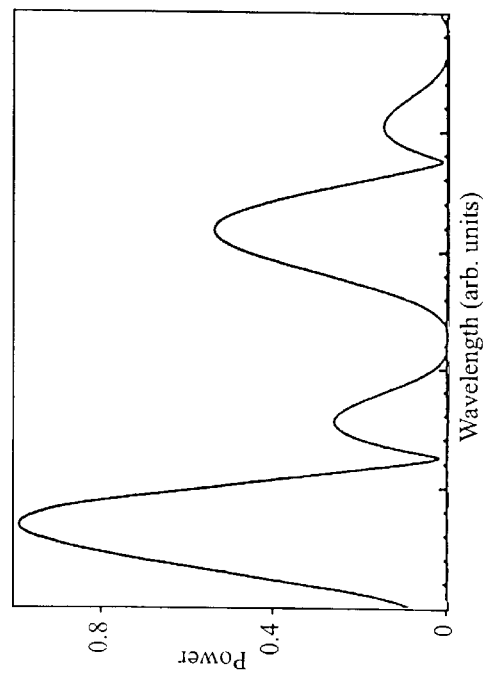
Figure 13:
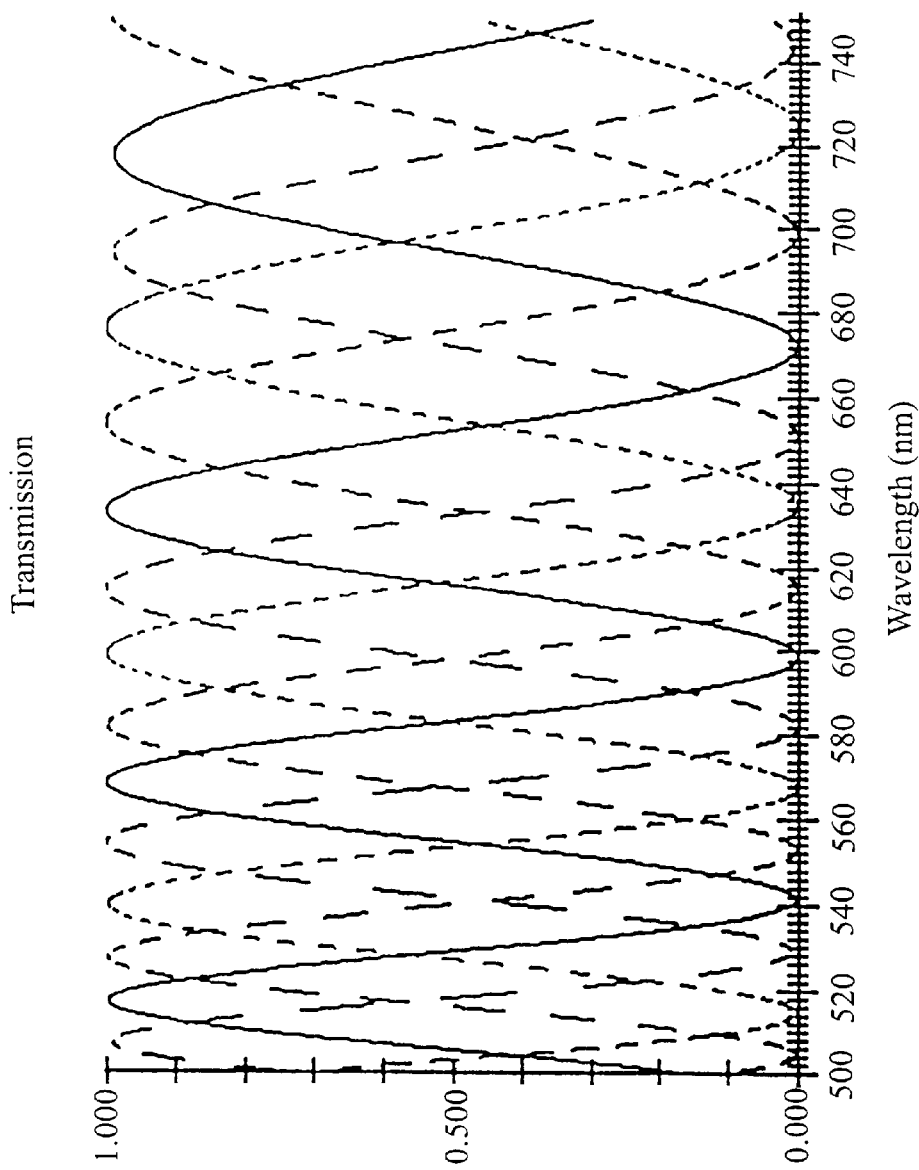
FIG. 13 demonstrates the achromaticity of the zero-order switch of the PIMS of FIG. 11 at four different phase shifts at a fixed order m.

FIG. 11 shows a preferred embodiment of a polarizing interferometer multiplex spectrometer. FIGS. 6, 12 and 13 demonstrate the performance and outputs of this structure. Table 1 further summarizes the structure.

As FIG. 11 shows, a preferred embodiment of the present invention comprises a first linear polarizer 1 followed by an achromatic quarter-wave switch 110 of the design shown in FIG. 7a which is followed by a multi-order switch 200 of the design shown in FIG. 10a which is followed by a half-wave switch 150 of the design shown in FIG. 8d which is followed by a second linear polarizer 2 oriented parallel to 1. The first polarizer 1 abuts a first end-cap 7 and the second polarizer 2 abuts a second end-cap and the whole of the above structure is disposed between the first end-cap 7 and the second end-cap 8, both of which abut substrates, and are chosen to improve wavefront distortion. In FIG. 11, the top value in each box indicates the retardance of the element, the middle value the design wavelength of the element, and the bottom value(s) the orientation(s) of the element. It should be noted that element 113 is an achromatic passive quarter-wave retarder, for example as taught by Pancharatnam. The preferred materials for the elements of a PIMS are as follows: the active LC elements, 111, 222, and 242 are all ferroelectric LC rotatable retarders, the passive retarder of the quarter-wave switch, 112, and the passive retarders of the half-wave switches, 221, 223, 241, and 243, are all composed of a polymer, such as poly-vinyl-alcohol, and the passive retarders of the multi-order switch, 211, 231, 212, 232, and 213, are quartz. In this embodiment the rotatable retarder is an FLC, but it can be any material with an electronically rotatable optic axis, including SmC* and SmA* liquid crystals, as well as distorted helix ferroelectric (DHF), antiferroelectric, and achiral ferroelectric liquid crystals. The FLC material used for this embodiment is ZLI4230, a material with the desired molecular tilt angle of 23.5° and a switching speed of 50 microseconds. Finally, the above structure was fabricated using all 2.5 cm outside diameter parts. Because of the glue line, the FLC devices were the limiting factor in the usable aperture. However, a 2.0 cm clear aperture can easily be provided.

FIG. 13 demonstrates the achromaticity of the zero-order switch of the PIMS of FIG. 11. To demonstrate this zero-order switch, the half-wave and quarter wave retarders were computer modeled on either side of a multi-order switch. The four superimposed calculations of $P_{out}$ as a function of input light wavelength shown in FIG. 13 demonstrate that the structure is quite achromatic.

The multi-order switch of FIG. 1 changes the period of a sinusoidal transmission function by digitally switching the period in multiples m of the input spectrum bandwidth $\Delta\omega$. In this embodiment, where the bandwidth is 250 nm, with a center wavelength of 625 nm, the free-spectral-range is 310 nm and steps of the period in increments of two full-waves may be employed without fear of aliasing the recovered spectrum. In this embodiment, the sequence of passive retarder retardances is very nearly geometrical, 211 has a retardance of $15\lambda$, 231 has a retardance of $8\lambda$, 212 has a retardance of $4\lambda$, 232 has a retardance of $2\lambda$, and 213 has a retardance of $1\lambda$. Hence, the combinations of the $2^n$ sum/differences of the retarder time delays yields an arithmetic series $(0, \tau_0, 2\tau_0, 3\tau_0 \ldots (2^n-1)\tau_0)$ of time delays. Thus, since the multi-order switch of FIG. 11 is comprised of n=4 sub-switches, this structure provides time delay indexes from m=1 to m=16. This multi-order switch therefore provides a zero-time delay state, and two-wave steps up to 30-waves, as summarized in Table 1. Table 1 shows the operation of the switches to yield a specific index m and the resultant time-delay for that index m for the multi-order switch of FIG. 11. In addition, a half-wave of residual retardance results when an odd number of half-wave switches are in the summing-state. To compensate for this, a half-wave switch oriented at $-\pi/4$ can be added. Finally, since the maximum value of m obtainable in practice is finite, the multi-order switch structure should provide a sufficiently large value of m to resolve all significant features of a spectrum.

TABLE 1

| Index | Operation | Resulting Delay ($x\tau_o$) | Orientation of | | | | Phase Shifter Half-Wave Switch | Phase Shifter Quater-Wave Switch |
| | | | S1 | S2 | S3 | S4 | | |
| --- | --- | --- | --- | --- | --- | --- | --- | --- |
| 1 | 15 − 8 − 4 − 2 − 1 | 0 | 0 | $3\pi/4$ | $\pi/4$ | $3\pi/4$ | $\pi/4$, 0 | 0, $\pi/4$ |
| 2 | 15 − 8 − 4 − 2 + 1 | 2 | 0 | $3\pi/4$ | $\pi/4$ | $\pi/2$ | 0, $\pi/4$ | 0, $\pi/4$ |
| 3 | 15 − 8 − 4 + 2 − 1 | 4 | 0 | $3\pi/4$ | 0 | $\pi/2$ | $\pi/4$, 0 | 0, $\pi/4$ |
| 4 | 15 − 8 − 4 + 2 + 1 | 6 | 0 | $3\pi/4$ | 0 | $3\pi/4$ | 0, $\pi/4$ | 0, $\pi/4$ |
| 5 | 15 − 8 + 4 − 2 − 1 | 8 | 0 | $\pi/2$ | 0 | $3\pi/4$ | $\pi/4$, 0 | 0, $\pi/4$ |
| 6 | 15 − 8 + 4 − 2 + 1 | 10 | 0 | $\pi/2$ | 0 | $\pi/2$ | 0, $\pi/4$ | 0, $\pi/4$ |
| 7 | 15 − 8 + 4 + 2 − 1 | 12 | 0 | $\pi 12$ | $\pi/4$ | $\pi/2$ | $\pi/4$, 0 | 0, $\pi/4$ |
| 8 | 15 − 8 + 4 + 2 + 1 | 14 | 0 | $\pi/2$ | $\pi/4$ | $3\pi/4$ | 0, $\pi/4$ | 0, $\pi/4$ |
| 9 | 15 + 8 − 4 − 2 − 1 | 16 | $\pi/4$ | $\pi/2$ | $\pi/4$ | $3\pi/4$ | $\pi/4$, 0 | 0, $\pi/4$ |
| 10 | 15 + 8 − 4 − 2 + 1 | 18 | $\pi/4$ | $\pi/2$ | $\pi/4$ | $\pi/2$ | 0, $\pi/4$ | 0, $\pi/4$ |
| 11 | 15 + 84 + 2 − 1 | 20 | $\pi/4$ | $\pi/2$ | 0 | $\pi/2$ | $\pi/4$, 0 | 0, $\pi/4$ |
| 12 | 15 + 8 − 4 + 2 + 1 | 22 | $\pi/4$ | $\pi/2$ | 0 | $3\pi/4$ | 0, $\pi/4$ | 0, $\pi/4$ |
| 13 | 15 + 8 + 4 − 2 − 1 | 24 | $\pi/4$ | $3\pi/4$ | 0 | $3\pi/4$ | $\pi/4$, 0 | 0, $\pi/4$ |

TABLE 1-continued

| Index | Operation | Resulting Delay ($x\tau_o$) | Orientation of S1 | S2 | S3 | S4 | Phase Shifter Half-Wave Switch | Phase Shifter Quater-Wave Switch |
|---|---|---|---|---|---|---|---|---|
| 14 | 15 + 8 + 4 − 2 + 1 | 26 | π/4 | 3π/4 | 0 | π/2 | 0, π/4 | 0, π/4 |
| 15 | 15 + 8 + 4 + 2 − 1 | 28 | π/4 | 3π/4 | π/4 | π/2 | π/4, 0 | 0, π/4 |
| 16 | 15 + 8 + 4 + 2 + 1 | 30 | π/4 | 3π/4 | π/4 | 3π/4 | 0, π/4 | 0, π/4 |

The finesse of the present invention is determined by the number of sub-switches in the multi-order switch. Since each of the $2^n$ states of the n half-wave switches is used, each additional sub-switch doubles the finesse. Further, unlike a tunable bandpass filter, this increase in finesse is not obtained at the expense of instrument peak transmission. The finesse of the FIG. 11 filter is 16.

A number of steps can be taken to provide high peak transmission. Because of the selection of operating bands, moderate-transmission sheet polarizer (84% of polarized light) can be used. The filter is optically cemented together with index-of refraction matching epoxy, eliminating internal Fresnel losses. Also, broad-band anti-reflective (AR) coated substrates with end-caps, 7 and 8, can be cemented in place to eliminate the outer surface losses. High transmission ITO coatings (300 W/cm2) can be used for the FLC elements, limiting losses to roughly 2% per LC cell. Finally, the quartz and polymer passive retarders are essentially lossless. In view of these considerations, the peak transmission of the filter can be better than 70% of polarized light (>35% of unpolarized).

Since the finesse is determined by the number of sub-switches, the most efficient use of hardware is obtained by maximizing the time delay step between each sample. The maximum allowable step corresponds to a lowest-order filter spectrum with period matched to the bandwidth of the spectrum. We can calculate the maximum step in number of waves using the following $$m_0(\text{waves}) = \text{INTEGER}\left(\frac{\lambda_0}{\Delta\lambda}\right) \tag{28}$$

A preferred operating band is 500 nm–750 nm. A 250 nm bandwidth, centered at 625 nm, corresponds to a 40% bandwidth, or a retardance step of 2.0 waves. The orders then step in sixteen steps, m, of two waves, starting from zero waves and ending with thirty waves. The maximum resolution is obtained using the 30-wave order. In this embodiment, which utilizes quartz passive retarders, this corresponds to a full-width of 6 nm at 500 nm and 14 nm at 750 nm. This gives a worst case resolution of 7 nm. Further, an order step of two-waves is below the 2.5 waves required to avoid aliasing; thus, in principle, the present invention has an operating band in excess of 250 nm.

The field of view is determined by the maximum tolerable wavelength shift of input light that enters at off-normal incidence. This corresponds to a spectral shift of the multi-order switch fringes in excess of 10% of the bandwidth of the highest-order. In this embodiment, the PIMS has a resolution of 6 nm at 500 nm. Since the measured performance characteristics for the PIMS of FIG. 11 are for a PIMS which was not wide-fielded (as described in U.S. Pat. No. 5,528,393 which is herein incorporated by reference in its entirety), this embodiment exhibits an azimuth dependent FOV. The worst case azimuth angles, ±π/4, show 10% shifts at an incidence angle of 5°, and a 10% shifts at an incidence angle of 30° for azimuth angles 0, ±π/2.

As discussed above, the FLC material has a settling time of 50 μs with the appropriate electric field. This allows a PIMS to recover the spectrum by measuring only two changes in optical power at each order. This represents four switched states of the FLC at each order. In a preferred embodiment, the PIMS has sixteen orders, giving a total of 64 switched states. Given a settling time of 50 μs and a relatively small integration time, this gives a spectral update rate of 3.2 milliseconds. Therefore, this embodiment can update the spectrum at ten-times video rate at this resolution, or at video rate with a resolution of 302.

EXAMPLE 2

Input Spectrum Recovery

In this example we consider the basic concepts of spectral recovery using a PIMS, which extracts a finite number of Fourier series coefficients. The recovered spectrum, of course, is the ideal truncated Fourier series expansion of the input spectrum. FIGS. 12a–d demonstrate this recovery.

Computer modeling was performed using equation 12 for ideal PIMS transmission functions. This means that the sinusoids produced by the PIMS have infinite contrast, 100% peak transmission, there is no dispersion (period is constant with frequency), and the zero-order switch is completely achromatic. A band-limited input spectrum, S(w), was generated in software which is shown in FIG. 12a. Using the transmission function T(w) of Equation 6, the overlap integrals were calculated at each order, i.e., index m, and for each of the four achromatic phase shifts φ. These integrals represent the power signals presented to a detector, shown in FIG. 12b, as the PIMS cycles through each sequence of phase shifts at an index m. The peak-peak values of sequential pairs of detector measurements thus represent the amplitudes of the Fourier series coefficients for the even and odd terms at each delay, respectively. This signal, which consists of 64 detector measurements, and 32 pieces of information, is representative of the signals provided by a PIMS. The Fourier series is formed as outlined in the above equations. The reconstructed input spectrum recovered from the signal of FIG. 12b is shown in FIG. 12c as a dashed line and the original input spectrum S(w) as a solid line. Obviously, truncation of the series at m=16 limits the ability of the PIMS to resolve the highest frequency content of the input spectrum. However, the spectrum can be recovered with better precision near the nulls using a 32 Fourier coefficients reconstruction, requiring 64 pieces of information. This spectrum, shown in FIG. 12d is nearly a perfect representation of the input spectrum.

EXAMPLE 3

Modeling of Non-Ideal Performance

After recovering spectra using ideal PIMS transmission functions, the predicted transmission functions obtained from the Mueller matrix analysis were used. These were generated using all of the switched states of the structure shown in FIG. 11. From a general point of view, the actual transmission function for any output of a PIMS device can be written in the form $$T(\omega) = \eta(\omega)\left(\cos^2\left(\frac{\pi m}{\Delta \omega}\frac{\Delta n(\omega)}{\Delta n(\omega_0)}\omega + \frac{\phi(\omega)}{2}\right) + \epsilon(\omega)\right) \quad (29)$$

where $\eta(\omega)$ represents all loss mechanisms, including polarizer absorption, ITO loss, and detector responsivity. The effect of birefringence dispersion is indicated, along with any frequency dependence of the achromatic zero-order switch. Finally, leakage due to scatter, or null leakage that is inherent to a particular design shows up as an additive term, $\epsilon(\omega)$. All of these effects show up to some degree, however small, and their effect must be taken into account.

First, $\eta(\omega)$ is common to all measurements and therefore shows up in the recovered spectrum as a feature of the input. Like any spectrometer, the effects of the instrument must be removed by recording the spectrum with no sample present. All subsequent measurements are normalized by this spectrum to get the true output.

Dispersion of the birefringence has the effect of stretching the spectrum in the red and compressing it in the blue. As a consequence, the PIMS of FIG. 11 is not a perfect linear system in $\omega$, but is actually linear in $\Delta n(\omega)\omega$. As a result, the Fourier series reconstruction of the input spectrum can account for this and be written in the form $$S(\omega) = \frac{1}{\Delta \omega}\left[P_0 + 2\sum_{m=1}^{\infty} P_m^A \cos\left(\frac{2\pi m}{\Delta \omega}\frac{\Delta n(\omega)}{\Delta n(\omega_0)}\omega\right) + P_m^B \sin\left(\frac{2\pi m}{\Delta \omega}\frac{\Delta n(\omega)}{\Delta n(\omega_0)}\omega\right)\right] \quad (30)$$

Figure 14:
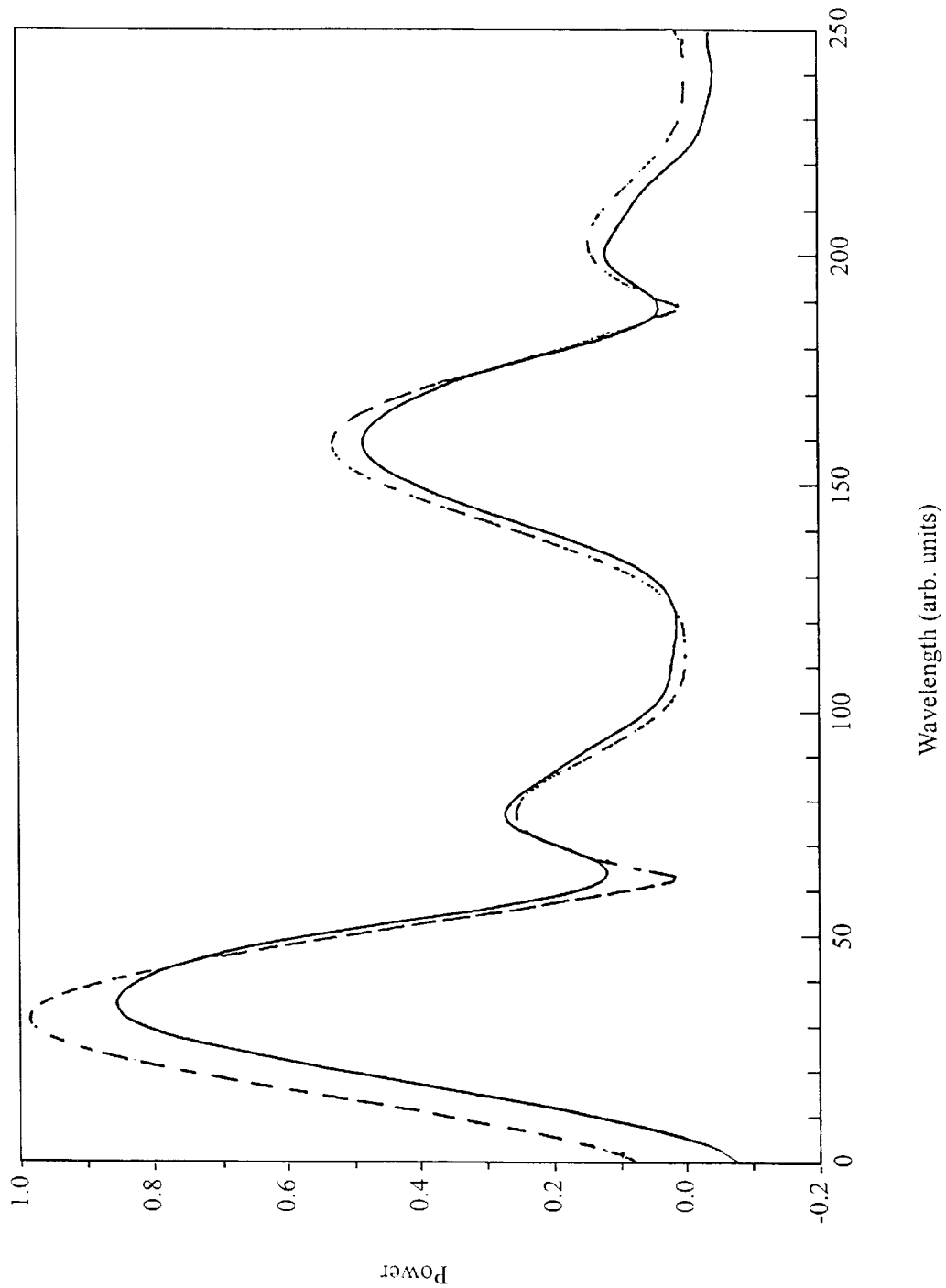
FIG. 14 demonstrates a comparison of the recovered spectrum for m=16 (dashed line) and the input spectrum (solid line) where non-ideal behavior of a PIMS has been included.

Computer modeling was performed using equation 30 for non-ideal PIMS transmission functions. Mueller matrix spectra were produced in the wavelength domain and included the effects of both quartz and polymer birefringence dispersion. The spectra, therefore, were converted to the frequency domain before inserting them as input to the signal processing software. FIG. 14 shows the reconstructed input spectra using this model.

Figure 15A:
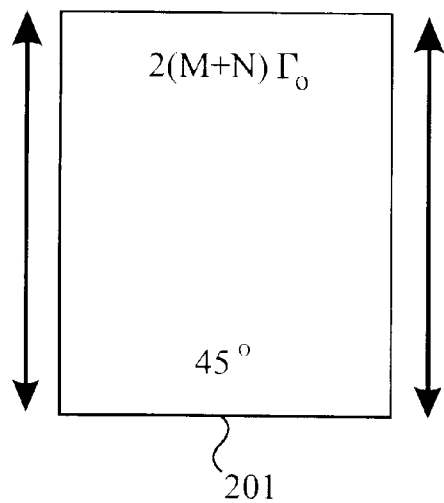
FIGS. 15a–b, shows interferometers having (a) an ideal multi-order retarder and (b) a compound multi-order retarder with some chromaticity.
Figure 15B:
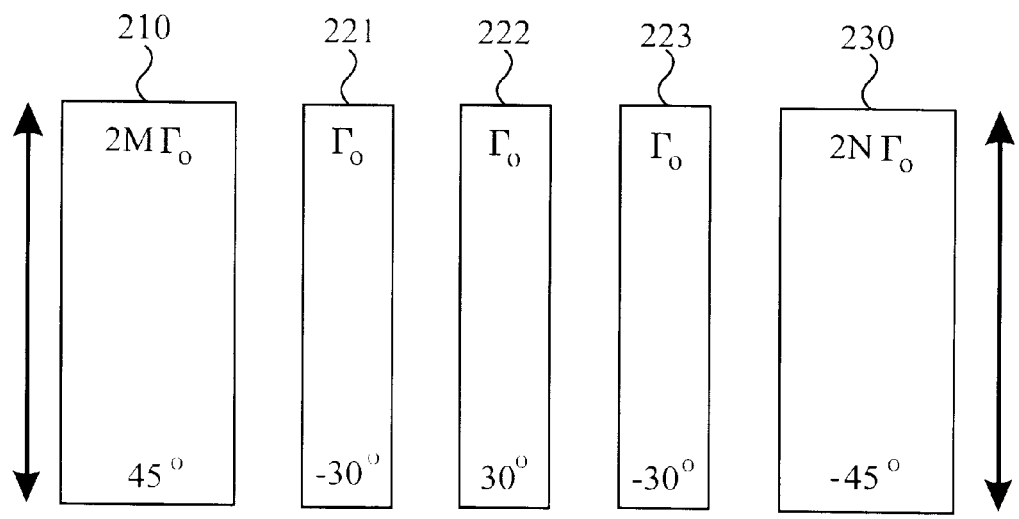

The chromaticity of the multi-order switch can also introduce error into the spectrum FIG. 15 shows (a) an ideal multi-order retarder 201 between polarizers, and (b) a multi-order switch with some chromaticity. The multi-order switch comprises passive multi-order retarders 210 and 230 with an approximately achromatic half-wave composite retarder formed by retarders 221, 222 and 223. Ideally the spectra of the devices of FIGS. 15a and 15b would be identical.

Figure 16A:
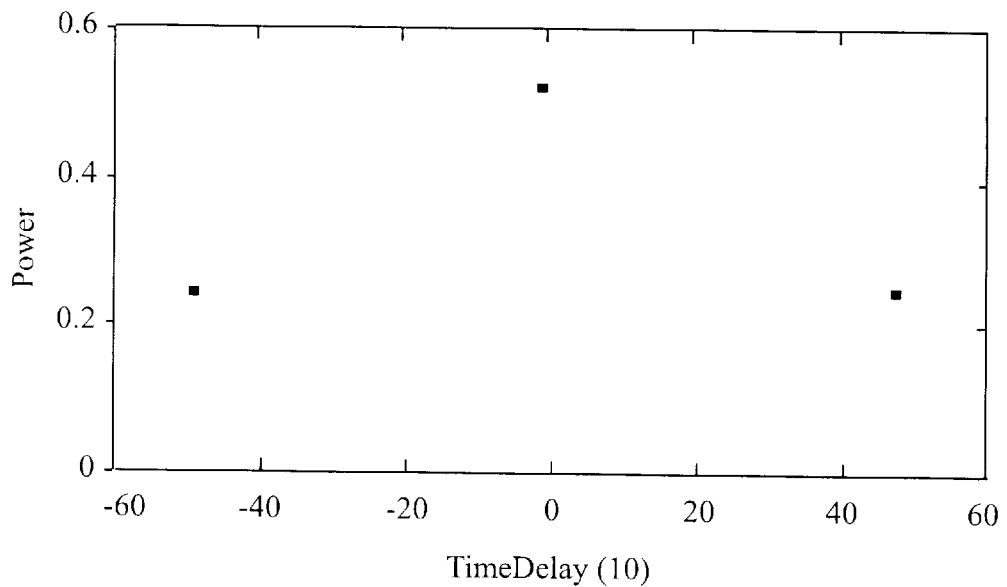
FIG. 16a–b, shows the transmission of the interferometers of FIGS. 15a–b.

FIG. 16a shows the output of the device of FIG. 15a, which is the ideal output of the order switch of FIG. 15b. If the half-wave switch of FIG. 15b preserved retardance at all frequencies, the output would be that of a single multi-order retarder oriented at 45°. For a single retarder, the power is contained in a DC component, and symmetric impulses at the appropriate delay. In this case, the DC component is a common mode and can be removed in a fashion discussed previously. Note that these impulses have zero width, as the dispersion of all components is assumed to be the same. In actuality, the different dispersion of polymer, LC and quartz contributes to the width.

Figure 16B:
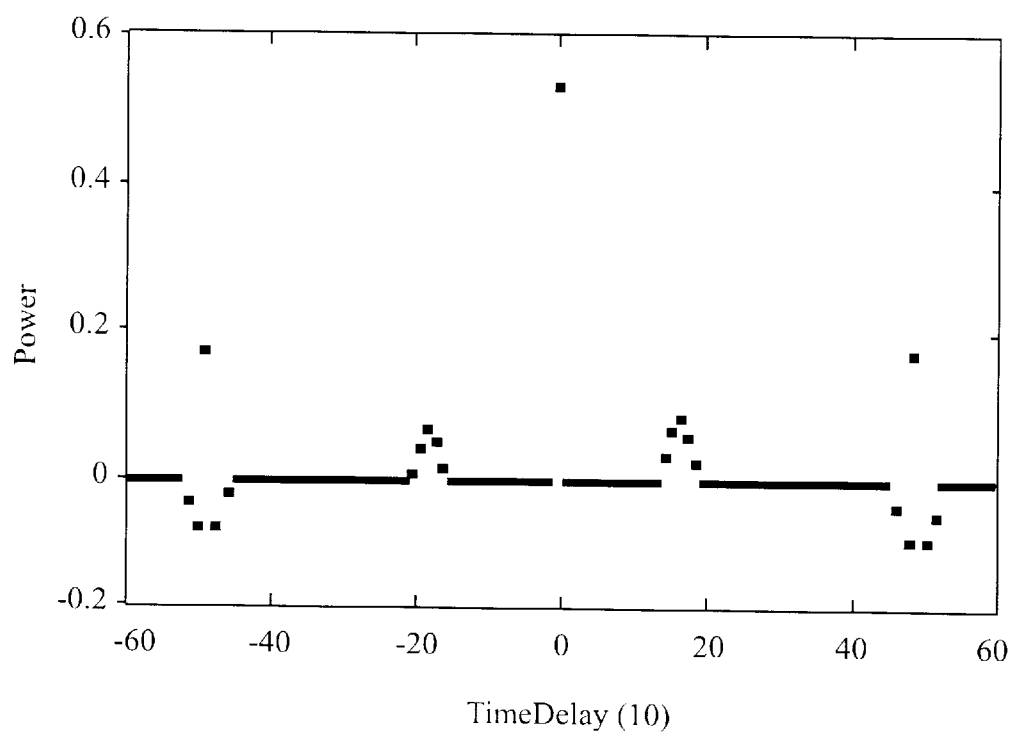

FIG. 16b shows computer model output of the switch of FIG. 15b with the achromatic compound retarder oriented at zero. The order switch is in the sum mode, as the outside retarders are crossed. When the bandwidth is infinite there is significant cross-talk owing to the chromaticity of the half-wave switch. This cross talk spills power into impulse clusters centered at time delays associated with both the sum and difference retardance. For instance, the contribution to the sum is large when the retardance of the central elements is half-wave and the contribution to the difference is large when the retardance of the central elements is full-wave. Power is robbed from the desired (former) term, as the DC component in general has the ideal ½ amplitude. In addition, there are side-bands due to intermodulation. Clearly, it is preferred to operate the switch in a limited band centered at the half-wave retardance of the central elements.

In order to obtain improved output spectra, the filter can be band-limited. This can be achieved by windowing the spectrum about a center frequency at which the central elements are half-wave retarders. This represents a convolution of the impulse response with a sinc function, which slightly broadens the terms. However, apodization allows one to generate spectra more approximating the ideal case of FIG. 16a. The apodization does not represent a loss in resolution, as the width exceeds that of the input spectrum.

For any operating bandwidth, the contribution due to cross-talk is present at some level. Maximizing the dynamic range of the instrument and minimizing distortion of the recovered spectrum can be achieved using a recovery algorithm which accounts for their contribution to each power measurement. In this case, a simple subtraction does not eliminate the common mode. Each power measurement consists of the DC term, the desired contribution, and a series of contributions at other delays. With a knowledge of the transmission function in each state of the filter, the input spectrum can be extracted mathematically.

This invention is described with reference to preferred embodiments; however, it will be apparent to those skilled in the art that additional equivalent procedures and structures may be substituted in the practice of this invention for those disclosed herein within the scope and spirit of applicant's contribution to the art. For example, in practice the orientations and retardances of the optical elements of a PIMS are substantially the orientations and retardances disclosed herein; i.e., the orientations disclosed herein may be varied by several degrees and the retardances disclosed herein may be varied by several percent. Further, it should be noted that the above orderings of the elements of the PIMS are only several possible configurations. Other embodiments, which are spectrally equivalent, can have significantly different configurations. It is therefore to be understood that the present invention may be practiced other than as specifically described and should be limited only by the breadth and scope of the appended claims.

We claim:

1. A polarizing interferometer for use with polarized light, comprising:

a zero-order switch having a composite orientation of ±π/4 and having a first, a second, a third and a fourth composite retardance state, wherein said composite retardation states are separated by a quarter-wave of retardation;

a multi-order switch having a fixed composite orientation of ±π/4, and having two or more composite retardance states in a common optical path with said zero-order switch;

an analyzer polarizer in the optical path of light propagated through said zero-order and multi-order switches; and a detector capable of detecting the wavelength-insensitive shifts of interference fringes produced by said switches.

2. The interferometer of claim 1 wherein said multi-order switch is switchable between said composite retardance states.

3. The interferometer of claim 2 wherein said multi-order switch comprises, arranged in a common pa:
  (a) a first passive retarder oriented at $\pm\pi/4$; and
  (b) n sub-switches, wherein n is an integer greater than zero and wherein each of said sub-switches comprise:
    (1) a half-wave switch having a composite orientation switchable between a first orientation $\alpha_n = \pm\pi/4$ and a second orientation $\alpha_n' = \alpha_n \pm \pi/4$; and
    (2) a passive retarder oriented at $\pm\pi/4$; and
  (c) wherein the above said elements are ordered such that each said half-wave switch is positioned between two of said passive retarders.

4. The interferometer of claim 3 wherein each of said half-wave switches are achromatic.

5. The interferometer of claim 4 wherein each of said half-wave switches comprise a first passive retarder, a second passive retarder, and an active liquid crystal retarder arranged in a common optical path.

6. The interferometer of claim 5 wherein:
  (a) said active liquid crystal retarder is positioned between said first passive retarder and said second passive retarder; and
  (b) said first passive retarder is a half-wave retarder oriented at $\theta_n = \pi12 + k\pi/4$; wherein k is an integer; and
  (c) said second passive retarder is a half-wave retarder oriented parallel to $\theta_n$; and
  (d) said active liquid crystal retarder is a half-wave rotatable retarder with an orientation switchable between $\alpha = \theta_n + \pi/3$, in a first state, and $\alpha' = \alpha + \pi/4$, in a second state.

7. The interferometer of claim 5 wherein:
  (a) said active liquid crystal retarder is positioned between said first passive retarder and said second passive retarder; and
  (b) said first passive retarder is a half-wave retarder oriented at $\theta_n = \pi/12 + k\pi/4$; wherein k is an integer; and
  (c) said second passive retarder is a half-wave retarder oriented parallel to $\theta_n$; and
  (d) said active liquid crystal retarder is a first variable retarder oriented at $\theta_n' + \theta_n + \pi/3$ with a retardance switchable between $\lambda/2$, in a first state, and 0, in a second state; and said half-wave switch further comprises
  (e) a second variable retarder, positioned between said first passive retarder and said second passive retarder, oriented at $\theta_n' + \pi/4$ with a retardance switchable between 0, in a first state, and $\lambda/2$, in a second state.

8. The interferometer of claim 3 wherein n is greater than one.

9. The interferometer of claim 8 wherein said passive retarders have a geometric or near geometric progression of relative retardances.

10. The interferometer of claim 1 wherein said multi-order switch is a patterned retarder having a spatial pattern of said composite retardance states.

11. The interferometer of claim 1 wherein said zero-order switch is achromatic.

12. The interferometer of claim 1 wherein said zero-order switch is switchable between said composite retardance states.

13. The interferometer of claim 12 wherein said zero-order switch comprises a quarter-wave switch and a half-wave switch arranged in a common optical path.

14. The interferometer of claim 13 wherein said multi-order switch is positioned between said quarter-wave switch and said half-wave switch.

15. The interferometer of claim 13 wherein said quarter-wave switch comprises an active liquid crystal retarder and a first passive retarder.

16. The interferometer of claim 15 wherein:
  (a) said quarter-wave switch is positioned adjacent to said polarizer or adapted to be adjacent to said polarized input light; and
  (b) said first passive retarder is a quarter-wave retarder oriented at 0 or $\pi/2$; and
  (c) said active liquid crystal retarder is a half-wave rotatable retarder with an orientation switchable between $\alpha$, in a first state, and $\alpha'$, in a second state; and said quarter-wave switch further comprises
  (d) a second passive retarder with a half-wave retardance oriented at $\theta$ where one of $\theta$ and $\alpha$ equals $-3\pi/16$ and the other of $\theta$ and $\alpha$ equals $-9\pi/16$, and $\alpha' = \theta - \pi/2$.

17. The interferometer of claim 15 wherein
  (a) said quarter-wave switch is positioned adjacent to said polarizer or adapted to be adjacent to said polarized input light; and
  (b) said first passive retarder is a quarter-wave retarder oriented at 0 or $\pi/2$; and
  (c) said active retarder is a first variable retarder oriented at $-3\pi/16$ with a retardance switchable between $\lambda/2$, in a first state, and 0, in a second state; and said quarter-wave switch further comprises
  (d) a second variable retarder, positioned between said first passive retarder and said first variable retarder, oriented at $-9\pi/16$ with a retardance switchable between $\lambda/2$, in a first state, and 0, in a second state.

18. The interferometer of claim 15 wherein:
  (a) said first passive retarder is a $8\lambda/25$ retarder oriented at $\theta = 14° + k\pi/4$, wherein k is an integer; and
  (b) said active liquid crystal retarder is a half-wave rotatable retarder with an orientation switchable between $\alpha = 85° + k\pi/4$, in a first state, and $\alpha' = 110° + k\pi/4$, in a second state; and said quarter-wave switch further comprises
  (c) a second passive retarder with a $8\lambda/25$ retardance and oriented parallel to $\theta$; and
  (d) said active liquid crystal retarder is positioned between said first passive retarder and said second passive retarder.

19. The interferometer of claim 15 wherein:
  (a) said first passive retarder is a $8\lambda/25$ retarder oriented at $\theta = 14° + k\pi/4$, wherein k is an integer; and
  (b) said active liquid crystal retarder is a first variable retarder oriented at $85° + k\pi/4$, with a retardance switchable between $\lambda/2$, in a first state, and 0, in a second state; and said quarter-wave switch further comprises
  (c) a second variable retarder, oriented at $110° + k\pi/4$ with a retardance switchable between 0, in a first state, and $\lambda/2$, in a second state; and
  (d) a second passive retarder with a $8\lambda/25$ retardance oriented parallel to $\theta$; and wherein
  (e) said first and second variable retarders are positioned between said first passive retarder and said second passive retarder.

20. The interferometer of claim 13 wherein said half-wave switch comprises a first passive retarder and an active liquid crystal retarder.

21. The interferometer of claim 20 wherein:
  (a) said half-wave switch is positioned adjacent to said polarizer or adapted to be adjacent to said polarized input light; and
  (b) said first passive retarder is a quarter-wave retarder oriented at 0 or $\pi/2$; and (c) said active liquid crystal retarder is a half-wave rotatable retarder with an orientation switchable between α, in a first state, and α', in a second state; and said half-wave switch further comprises (d) a second passive retarder with a half-wave retardance oriented at θ where one of θ and α equals π/8 and the other of θ and a equals 3π/8, and α'=θ±π/2.

22. The interferometer of claim 20 wherein:
(a) said half-wave switch is positioned adjacent to said polarizer or adapted to be adjacent to said polarized input light; and
(b) said first passive retarder is a quarter-wave retarder oriented at 0 or π/2; and
(c) said active retarder is a first variable retarder oriented at π/8 with a retardance switchable between λ/2, in a first state, and 0, in a second state; and said half-wave switch further comprises
(d) a second variable retarder, positioned between said first passive retarder and said first variable retarder, oriented at 3π/8 with a retardance switchable between λ/2, in a first state, and 0, in a second state.

23. The interferometer of claim 20 wherein:
(a) said first passive retarder is a half-wave retarder oriented at θ=π/12+kπ/4; wherein k is an integer; and
(b) said active liquid crystal retarder is a half-wave rotatable retarder with an orientation switchable between α=θ$_n$+π/3, in a first state, and α'=α+π/4, in a second state; and said half-wave switch further comprises
(c) a second passive retarder with a half-wave retardance oriented parallel to θ; and
(d) said active liquid crystal retarder is positioned between said first passive retarder and said second passive retarder.

24. The interferometer of claim 20 wherein:
(a) said first passive retarder is a half-wave retarder oriented at θ$_n$=π/12+kπ/4; wherein k is an integer; and
(b) said active liquid crystal retarder is a first variable retarder oriented at θ$_n$'=θ$_n$+π/3 with a retardance switchable between λ/2, in a first state, and 0, in a second state; and said half-wave switch further comprises
(c) a second variable retarder oriented at θ$_n$'+π/4 with a retardance switchable between 0, in a first state, and λ/2, in a second state; and
(d) a second passive retarder with a half-wave retardance oriented parallel to θ; and wherein
(e) said first and second variable retarders are positioned between said first passive retarder and said second passive retarder.

25. The interferometer of claim 12 wherein said zero-order switch is a single variable retarder oriented at ±π/4 and tunable over at least a three-quarter wave of retardation.

26. The interferometer of claim 12 wherein said zero-order switch comprises:
(a) a first liquid crystal variable retarder oriented at θ=±π/4 and switchable between 0 retardance, in a first state, and λ/4 retardance, in a second state; and
(b) a second liquid crystal variable retarder, oriented parallel or perpendicular to θ, and switchable between 0 retardance, in a first state, and λ/2 retardance, in a second state.

27. The interferometer of claim 1 wherein said zero-order switch has a spatial pattern of said composite retardance states.

28. The interferometer of claim 1 wherein said analyzer polarizer is a linear polarizer.

29. A multipixel interferometer array wherein each element of said array comprises an interferometer of claim 1.

30. A method of using the interferometer of claim 1 comprising the steps of:
impinging polarized input light on said interferometer; and
varying the composite retardance states of said zero-order switch and the composite retardance states of said multi-order switch such that a plurality of combinations of composite retardance states are obtained; and
measuring the power of the light transmitted through said spectrometer.

31. A method of obtaining a Fourier series of a spectrum from polarized light comprising the steps of:
obtaining overlap integrals of said spectrum with a series of sinusoids, wherein said series is obtained by the steps of:
providing the polarizing interferometer of claim 1;
varying the composite retardance of said zero-order switch, thereby varying the phase of said sinusoids between even and odd; and
varying the composite retardance of said multi-order switch, thereby varying the period of said sinusoids;
wherein said sinusoid phase variation and said sinusoid period variation can be performed in any sequence.

32. The method of claim 31 wherein said step of obtaining overlap integrals comprises the steps of:
passing said polarized light through said polarizing interferometer; and
measuring the total integrated power of the light transmitted through said polarizing interferometer.

33. A polarizing interferometer for use with polarized light, comprising:
a zero-order switch;
a multi-order switch having a fixed composite orientation of ±π/4, and having two or more composite retardance states in a common optical path with said zero-order switch;
an analyzer polarizer in the optical path of light propagated through said zero-order and multi-order switches; and
a detector capable of detecting the wavelength-insensitive shifts of interference fringes produced by said switches.

34. A polarizing interferometer for use with polarized light, comprising:
a zero-order switch having a composite orientation of ±π/4 and having a first, a second, a third and a fourth composite retardance state, wherein said composite retardance states are separated by a quarter-wave of retardation;
a multi-order switch;
an analyzer polarizer in the optical path of light propagated through said zero-order and multi-order switches; and
a detector capable of detecting the wavelength-insensitive shifts of interference fringes produced by said switches.

35. A method of obtaining a Fourier series of a spectrum from polarized light comprising the steps of:
obtaining overlap integrals of said spectrum with a series of sinusoids wherein said series is obtained by the steps of:
providing an interferometer comprising a zero-order switch and a multi-order switch;
varying the phase of said sinusoids between even and odd; and varying the period of said sinusoids; and wherein said sinusoid phase variation and said sinusoid period variation can be performed in any sequence.

36. The method of obtaining the Fourier series of a spectrum of claim 35 wherein said step of obtaining overlap integrals comprises the steps of:

passing said polarized light through an optical device, wherein the transmission function of said optical device is a sinusoid; and measuring the total integrated power of the light transmitted through said optical device.

37. The method of obtaining the Fourier series of a spectrum of claim 36 wherein said optical device comprises an analyzer polarizer and at least one retarder adapted to be positioned between said analyzer polarizer and said polarized light.

* * * * *

UNITED STATES PATENT AND TRADEMARK OFFICE
CERTIFICATE OF CORRECTION

PATENT NO. : 6,100,944
DATED : August 8, 2000
INVENTOR(S) : Sharp et al.

It is certified that error appears in the above-identified patent and that said Letters Patent is hereby corrected as shown below:

Column 7, line 24, please replace "FIG. 5," with --FIG. 5--.

Column 7, line 52, please replace "8a-g" with --8a-e--.

Column 8, line 10, please replace "comprise" with --comprised of--.

Column 15, lines 1 - 3, after "half-wave switch" please delete "with composite retardance states and composite orientation as shown in FIG. 8f".

Column 15, line 10, after "the off-state" please delete "as shown in FIG. 8f".

Column 15, line 39, please replace "off-state,." with --off-state.--

Column 15, line 49, please replace "off-state,." with --off-state.--

Column 15, lines 50 and 51, after "in the off-state" please delete "as shown in FIG. 8f".

Column 16, line 32, please replace "$\theta_o 14°$" with --$\theta_o=14°$--.

Column 16, lines 39 and 40, after "composite retardance" please delete "as shown in FIG. 8g".

Column 16, line 48, after "off-state" please delete ", as shown in FIG. 8g".

Column 17, line 17, please replace "orientation is $\pi/4$" with --orientation is $\pi/2$--.

Column 17, line 18, after "the off-state" please delete ", as shown in FIG. 8g".

UNITED STATES PATENT AND TRADEMARK OFFICE
CERTIFICATE OF CORRECTION

PATENT NO. : 6,100,944
DATED : August 8, 2000
INVENTOR(S) : Sharp et al.

It is certified that error appears in the above-identified patent and that said Letters Patent is hereby corrected as shown below:

Column 18, line 18, please replace "240" with --240B--.

Column 19, line 5, please replace "$\alpha_3\theta_1+5\pi/12$" with --$\alpha_3 = \theta_1+5\pi/12$--.

Column 23, line 45, please replace insert a period following "spectrum".

Column 25, line 2, in claim 3, please replace "pa" with --path--.

Column 25, line 24, in claim 6, please replace "$\theta_n = \pi 12 + k\pi/4$" with --$\theta_n = \pi/12 + k\pi/4$--.

Column 25, line 40, in claim 7, please replace "$\theta_n' + \theta_n + \pi/3$" with --$\theta_n' = \theta_n + \pi/3$--.

Column 28, lines 11 and 12, in claim 30, please replace "said spectrometer" with --said polarizing interferometer--.

Column 30, lines 6 and 7, in claim 37, please replace "said polarized light" with --a polarized light source--.

Signed and Sealed this

Twenty-ninth Day of May, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 6,100,944

DATED : August 8, 2000

INVENTOR(S) : Sharp et al.

It is certified that error appears in the above-identified patent and that said Letters Patent is hereby corrected as shown below:

Please replace FIG. 12C with the following FIG. 12C:

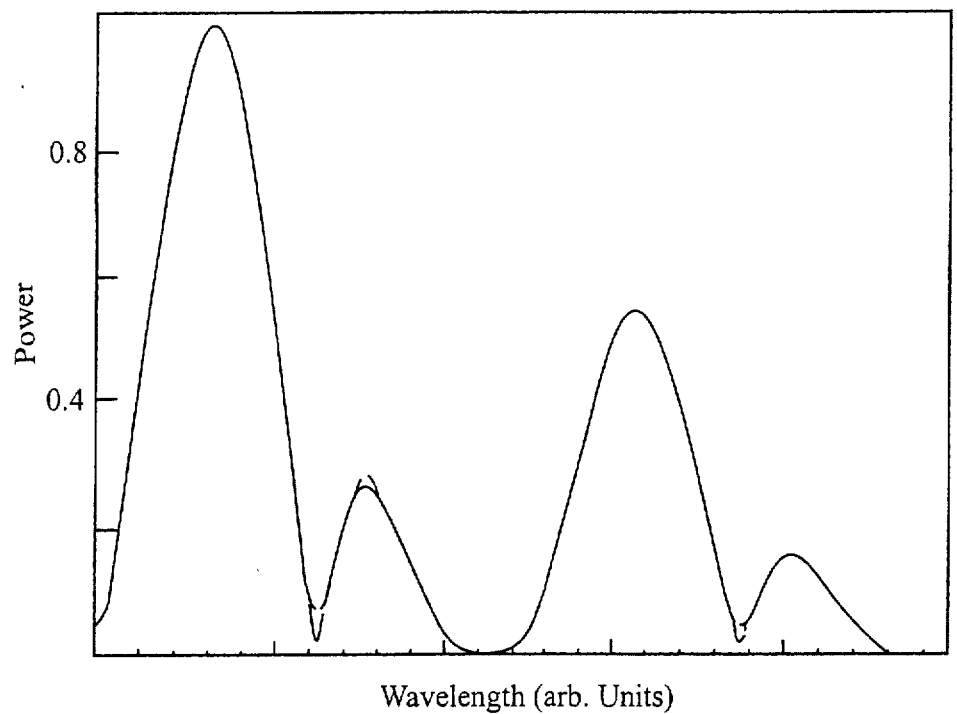

FIG. 12C